United States Patent [19]
Simone

[11] Patent Number: 5,794,328
[45] Date of Patent: Aug. 18, 1998

[54] AUTOMATED WINDOW SCREEN ASSEMBLY APPARATUS

[76] Inventor: Albert A. Simone, 3125 Woodbridge Ave., Building 6E, Edison, N.J. 08837

[21] Appl. No.: 731,874
[22] Filed: Oct. 18, 1996
[51] Int. Cl.⁶ .................................................. B23P 21/00
[52] U.S. Cl. ........................ 29/709; 29/243.5; 29/564.6; 29/281.4
[58] Field of Search ........................ 29/564.6, 564.8, 29/235, 709, 451, 281.4, 243.5; 269/71, 56, 58

[56] References Cited

U.S. PATENT DOCUMENTS

| | | |
|---|---|---|
| 2,608,750 | 9/1952 | Cluzel. |
| 2,638,131 | 5/1953 | Rohs ........................................ 29/235 |
| 2,683,925 | 7/1954 | Russell et al. ............................ 29/235 |
| 2,753,897 | 7/1956 | Conrad. |
| 3,017,698 | 1/1962 | Hambrecht et al.. |
| 3,623,211 | 11/1971 | Zuhlke. |
| 3,705,454 | 12/1972 | Zuhlke. |
| 3,851,684 | 12/1974 | Wyrick. |
| 4,307,503 | 12/1981 | Auld et al.. |
| 4,370,792 | 2/1983 | Watts. |
| 4,562,634 | 1/1986 | Watts. |
| 4,766,661 | 8/1988 | Croteau ..................................... 29/417 |
| 4,856,171 | 8/1989 | Croteau. |
| 4,899,429 | 2/1990 | Londono. |
| 5,018,264 | 5/1991 | Kautt ........................................ 29/564.8 |
| 5,052,093 | 10/1991 | Urlacher. |
| 5,069,739 | 12/1991 | Kautt ........................................ 156/468 |
| 5,072,496 | 12/1991 | Radermacher. |
| 5,088,188 | 2/1992 | Riou ......................................... 29/709 |
| 5,127,143 | 7/1992 | Urlacher. |
| 5,261,540 | 11/1993 | Sijsling. |
| 5,345,662 | 9/1994 | Gosselin et al. ......................... 29/235 |

FOREIGN PATENT DOCUMENTS

| | | | |
|---|---|---|---|
| 0051858 | 5/1982 | European Pat. Off. | ............ 29/564.6 |
| 3541865 | 11/1985 | Netherlands | ............................. 29/235 |

Primary Examiner—Joseph M. Gorski
Assistant Examiner—Katrina Davis
Attorney, Agent, or Firm—Ezra Sutton

[57] ABSTRACT

A splining apparatus for seating an elongated flexible spline in the screen retaining channel of a screen frame to secure flexible screen material thereto, including a work support assembly for receiving and holding the screen frame, and a carriage assembly for longitudinal movement between a first position and a second position. The splining apparatus further includes a screen roll feed holder assembly for supplying screen material located at the first position; and a spline roll holder for supplying spline material located at the second position. The carriage assembly supports a spline head assembly for supplying the spline to the screen frame as the carriage assembly moves from the second position to the first position. The spline head assembly includes a spline wheel sub-assembly for inserting and seating the spline into the screen retaining channel as the carriage assembly and the spline head assembly move from the first position to the second position. The spline head assembly also includes a spline cutter sub-assembly for cutting the spline at the second position after the spline and screen material have been seated in the screen retaining channel. The splining apparatus also includes an electronic sensor for sensing the end of the screen frame and for stopping the movement of the spline head assembly at the second position.

23 Claims, 22 Drawing Sheets

AUTOMATED WINDOW SCREEN ASSEMBLY APPARATUS

FIELD OF THE INVENTION

This invention relates to an automated window screen assembly apparatus for applying a length of spline and fabric screen into a screen retaining channel of a rectangular screen frame. More particularly, the automated window screen assembly apparatus automates the splining cycles of applying, pushing, inserting, and cutting of spline and fabric materials into a screen retaining channel of the screen frame.

BACKGROUND OF THE INVENTION

Standard window screens for homes, offices, trailers, RV's and the like include a rectangular screen frame which consists of an aluminum or steel frame having a fiber mesh screen material made of nylon, metal, fiberglass, or plastic being held in place with a flexible spline material made of rubber or soft plastic. The screen material is placed over the screen frame and the spline material is rolled into the grooved channel on the screen frame which tightly secures the screen mesh material to the screen frame. The prior practice for securing the spline material and fabric mesh screen to a screen frame included a rolling procedure or a spline-positioning procedure in which a small hand-held roller or a semi-automatic, but manually-operated, window screen assembly were used to accomplish the aforementioned task. These tools and devices for window screen assembly still require manual dexterity and physical strength in which to operate these appliances.

The use of this type of a manual tool or a semi-automatic manual device makes it difficult for prolonged production runs, as some of the operators developed arm-related medical injuries, such as tendinitis, which resulted in lost production time, lost wages and increased cost of goods manufactured.

Prior art automated window screen assembly devices for securing the spline material and the fabric mesh screen to a screen frame have complex clamping mechanisms which require the device to assure parallelism of the frame members. In addition, these automated devices have complex spline-loading and feeding mechanisms, such that the spline feed assembly and spline head assembly had to move at the same speed to apply spline to the screen frame correctly. Spline loading is complicated and the spline path followed is tortuous, as the spline feed assembly is powered. The spline feeding mechanisms of these automated devices have a round spline wheel for inserting the spline material into the spline grooved channel. This was not done effectively as the spline did not get pushed completely into the square corner. Further, these devices do not automatically detect frame size; so the operator had to know the exact size of the frame and program the frame size into the machine's computer component via a keyboard. In operation with many different sizes, this is very time-consuming and this step added to the cost of manufacture.

These automatic window screen devices had other ineffective operational steps where the screen material was cut from the screen roll only when the screen was completely splined which added to the cost of manufacture. In summary, the automatic window screen assembly devices are overly complex, bulky, and ineffective in operation which increased the cost of manufacture.

There remains a need for an automated window screen assembly apparatus that will automatically program the splining cycles of applying, pushing, inserting, and cutting of spline and fabric materials into a grooved channel of the window screen frame, without the requirement of parallelism (the frame does not have to be blocked) of frame members, as shown in the prior art devices. In addition, the automated window screen assembly apparatus should be of simple design for ease of manufacturing, which will increase productivity and lower the cost of manufacture of a window screen.

DESCRIPTION OF THE PRIOR ART

Window screen assembly apparatus of various designs, structure, styles, and materials of construction have been disclosed in the prior art. For example, U.S. Pat. No. 4,899,429 to Londono is directed to a hand tool for installing a pliable spline in a screen frame. The tool includes a front roller having a convex edge for pushing the screen into the channel of a screen frame, and a back roller having a concave edge for pushing the spline material into the channel over the screen.

U.S. Pat. Nos. 5,052,093 and 5,127,143 to Urlacher are directed to apparatus for inserting a flexible spline into a screen frame. The apparatus includes a carriage which is slidably mounted along one edge of a horizontal tabletop. The carriage includes a roller mounted on a bracket assembly which may be raised or pivoted between an upper inoperative position and a lower operative position. With the carriage in the proper inoperative position, a screen frame is placed against the edge of the table and the screen material is positioned over the frame. The carriage is then moved to one end of the frame and lowered into the operative position, whereby the edge of the roller forces the screen material and a spline into a channel in the frame. The carriage is then manually moved along the length of the frame to the opposite end, whereupon it is moved to the inoperative position, the screen frame is rotated 90 degrees, and the carriage is again lowered into its operative position to push the spline and screen material into the channel in the end of the frame. The procedure is repeated for the remaining two sides of the screen frame. Excess screen material is manually removed with a knife blade, and the spline is also cut manually with a knife blade after the screen has been completed.

U.S. Pat. No. 5,069,739 to Kautt is directed to an automated machine for fitting and cutting the seals of a window. The apparatus includes a carriage which is mounted on a gantry for movement in two directions in a horizontal plane. A manipulator head is mounted to the carriage via a vertical shaft for rotation among four positions oriented at 90 degrees to one another. One unit of the manipulator head includes a seal fitting roller and a guide roller, as well as a device for cutting the seal at the desired length. The other unit of the manipulator head includes a suction chamber which is pivotally mounted thereto, the suction chamber serving to hold the seal after it is cut, to bend it and to press it against the surface of the window frame. Each unit is independently moveable by a rack and pinion system. The first unit in a lowered position applies the seal to the window frame and, after a certain length of travel of the manipulator head, the second unit is lowered into contact with the already deposited seal. As the manipulator head nears the end of its travel, the first unit is raised and the cutting device is actuated to cut the seal which is then held against the suction chambers of both units. Subsequently, the suction chamber of the second unit is pivoted downwardly to press the cut end of the seal against the window frame. The entire manipulator head is then rotated 90 degrees and the procedure is repeated.

U.S. Pat. No. 2,753,897 to Conrad discloses a device for assembling framed screens. According to this reference, the apparatus consists of a rectangular support surface having vertically moveable floating carriers that are disposed along the perimeter thereof. A spline 84 is positioned in the channel between the vertically moveable carriers and a piece of screening cut to the proper size is then placed on the support surface overlying the splines. The screen frame is then placed above the sheet of screening so that the grooves are aligned above the spline. The entire assembly is then slid beneath a platen which presses the frame downward, forcing the edges of the screening and the splines into the grooves in one action. Once the platen is raised, the completed screen is removed from the support surface and the entire process is repeated for the next screen.

U.S. Pat. No. 3,851,684 to Wyrick discloses an apparatus for automatically assembling a flexible sheet of material, such as screening, to a frame. The apparatus consists of a work table to which a frame is secured in a stationary position. A length of screen material is pulled across the frame where it is temporarily clamped in place and tensioned. A first moveable carriage having a first pair of pressing rollers traverses a first pair of opposed parallel frame members, pressing the edges of the screen material into the spline grooves disposed therein. Once this step has been completed, the first moveable carriage reverses direction and returns to the starting position, during which time a second moveable carriage having a second pair of pressing rollers is activated to travel in a transverse direction, the second pair of pressing rollers pressing the transverse edges of the screen material into the spline grooves located in the second pair of parallel frame members. This patent is silent both as to how the length of screen is cut from the supply spool and how the excess screen is trimmed from the edges of the frame.

U.S. Pat. No. 4,766,661 to Croteau discloses another apparatus for automatically attaching a fabric material to a rectangular frame. The apparatus consists of a planar frame support surface disposed on a support structure. Two pairs of opposed parallel frame-engaging members include gripping means for holding the frame members securely in place. Two of the frame engaging members transverse to one another are displaceable to assure that the individual frame members are assembled in a parallel manner. A length of screen material is positioned over the frame to overlie the spline grooves located in the frame members. A spline positioner is then actuated to position and push the spline in the retention groove, while at the same time trimming the excess screen material along the exterior of the groove.

A control module programmed with the dimensions of the rectangular frame controls the movement of the spline positioner so that a the spline positioner reaches a corner of the frame the spline positioner is lifted, rotated 90° and lowered to press the edge of the screen and spline into the adjacent frame member. When a predetermined length of spline corresponding to the perimeter dimension of the rectangular frame has been fed through the spline positioner, the spline is severed. A separate cutting device cuts the screen across its width to sever the finished screen from the supply roll of screen material.

These prior art patents do not show an automated window screen assembly apparatus having a spline head assembly that automatically programs the splining cycles of applying, pushing, inserting and cutting of spline and fabric materials into a screen retaining channel of the screen frame without having to block and square the frame while in operational use. Also, the prior art patents do not show automatic frame size detection for assembling a variety of different sizes of window screen frames without further machine programming; and a slack wheel tension component for giving a predetermined amount of slack tension in the screen material as the window screen frame is being assembled, without bowing the frame once assembled.

Accordingly, it is an object of the present invention to provide an automated window screen assembly apparatus that automatically programs the splining cycles of applying, pushing, inserting and cutting of spline and fabric materials into a grooved channel of the window screen frame, without the necessity of the frame having to be blocked and squared.

Another object of the present invention is to provide an automated window screen assembly apparatus that has assemblies and component parts of simple design for ease of manufacturing which will increase productivity and lower the cost of manufacture of a window screen.

Another object of the present invention is to provide an automated window screen apparatus that has minimal operator input in handling and operating the apparatus with very low maintenance and repair for the operational production of the window screens.

Another object of the present invention is to provide an automated window screen assembly apparatus that uses simplified designed clamping assemblies which will block the frame properly by using a diagonal frame clamp and a corner clamp.

Another object of the present invention is to provide an automated window screen assembly apparatus that uses a spline head assembly for automatic frame size detection, such that the apparatus can work on a variety of frame sizes without further machine programming.

Another object of the present invention is to provide an automated window screen assembly apparatus that uses a simplified design for a spline feed assembly, such that the spline is in a relaxed, non-tensioned state when the frame is being splined which then minimizes stretch within the spline. This minimizing of spline stretch is accomplished by drawing the spline from the spline roll on the return path of the splining head assembly.

Another object of the present invention is to provide an automated window screen assembly apparatus that automatically cuts the spline at each of the frame corners and fully inserts the spline into each of the frame corners.

Another object of the present invention is to provide an automated window screen assembly apparatus that uses a slack wheel sub-assembly for putting a predetermined amount of slack tension in the screen material as the window screen frame is being assembled.

Another object of the present invention is to provide an automated window screen assembly apparatus that uses a corner clamp assembly which ensures both spline and screen material are completely and properly inserted into each frame corner.

Another object of the present invention is to provide an automated window screen assembly apparatus that uses a screen splining table having a vertical surface wall which uses gravity to ensure that the screen material properly drapes across the screen frame surface; such that the screen material does not have to be held firmly in place while the splining occurs.

Another object of the present invention is to provide an automated window screen assembly apparatus that uses a screen roll feed holder assembly having a plurality of individual holding compartments which are designed so that the individual screen rolls do not interfere with one another when the operator changes roll sizes.

Another object of the present invention is to provide an automated window screen assembly apparatus that uses a trimming sub-assembly which trims the miscellaneous strands of screen material being left in each of the frame corners.

A further object of the present invention is to provide an automated window screen assembly apparatus that uses a screen frame turning assembly which automatically turns the screen frame after each side is splined. This will eliminate total operator input until the window screen is completely done.

A still further object of the present invention is to provide an automated window screen assembly apparatus that uses a screen material advance assembly which automatically draws the screen material from the screen roll, such that the screen material is drawn across the screen frame until a screen sensor detects the edge of screen frame and stops the advance of the screen material.

An even further object of the present invention is to provide an automated window screen assembly apparatus that is simple to manufacture and assemble; and is also more cost efficient in operational use than previous automated window screen assembly devices.

SUMMARY OF THE INVENTION

In accordance with the present invention, there is a splining apparatus for seating an elongated flexible spline in the screen retaining channel of a screen frame to secure flexible screen material thereto, including a work support assembly for receiving and holding the screen frame, having an elongated support frame; a carriage assembly mounted on the support frame for longitudinal movement between a first position and a second position; and a motor and belt track for moving the carriage assembly between the first and second positions. The splining apparatus further includes a screen roll feed holder assembly for supplying screen material located at the first position; and a spline roll holder for supplying spline material located at the second position. The carriage assembly supports a spline head assembly for supplying the spline to the screen frame as the carriage assembly moves from the second position to the first position.

The splining apparatus also includes a corner clamp cutting assembly mounted on the support frame for cutting the spline material at the first position, and for seating the spline material and the screen material at the first position into the screen retaining channel of the screen frame. The spline head assembly includes a spline wheel sub-assembly for inserting and seating the spline into the screen retaining channel as the carriage assembly and the spline head assembly move from the first position to the second position. The spline head assembly also includes a spline cutter sub-assembly for cutting the spline at the second position after the spline and screen material have been seated in the screen retaining channel. The splining apparatus also includes an electronic sensor for sensing the end of the screen frame and for stopping the movement of the spline head assembly at the second position.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT OVERVIEW

The automated window screen assembly apparatus 10 and its component parts of the preferred embodiment of the present invention are used for the automated assembly of a screen material 16 into an aluminum window frame 12W. The assembly apparatus 10 and its component assemblies are represented in detail by FIGS. 1 through 22.

Figure 1:
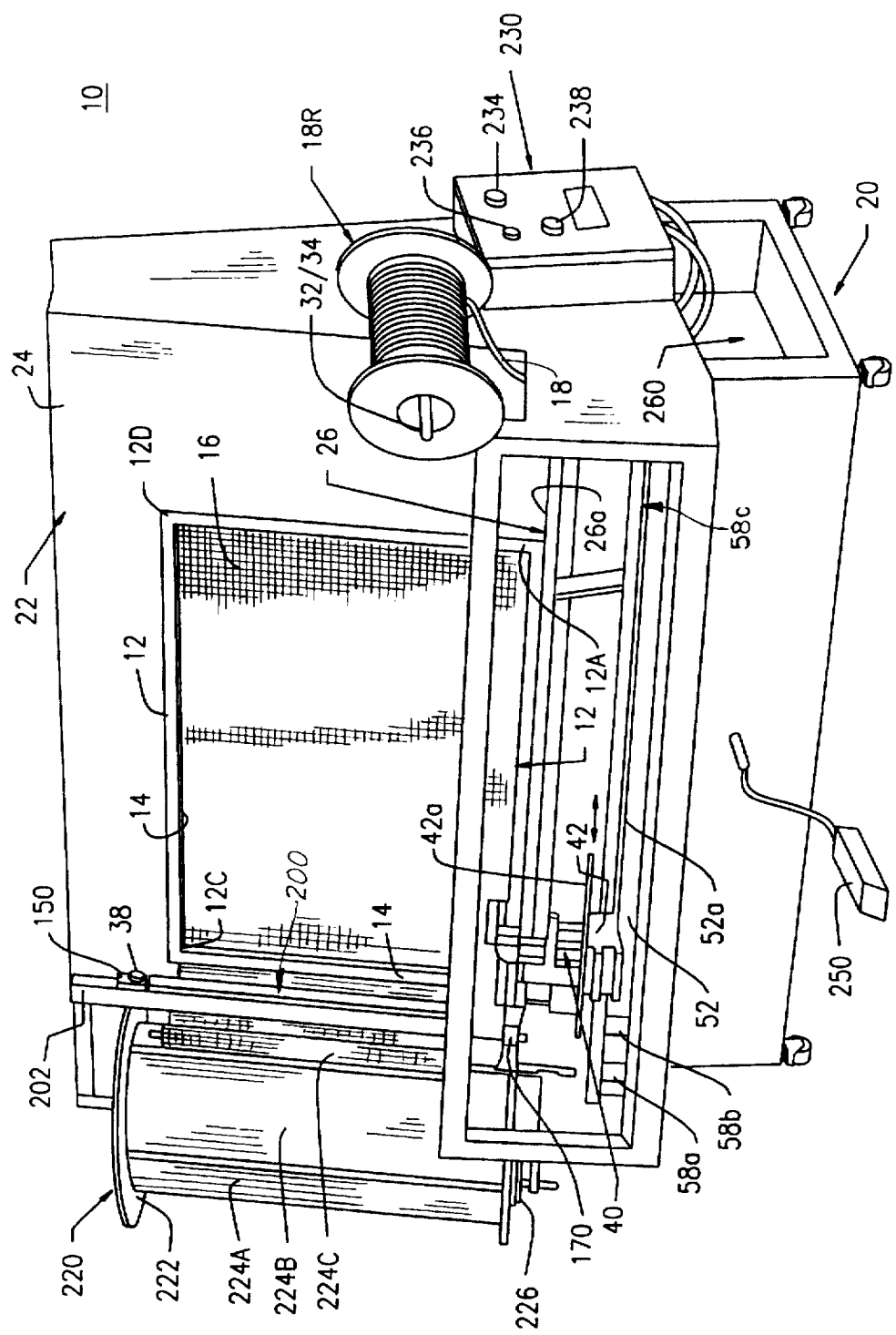
FIG. 1 is a perspective view of the automated window screen assembly apparatus of the preferred embodiment of the present invention showing the major component assemblies contained thereon and in operational use.
Figure 2:
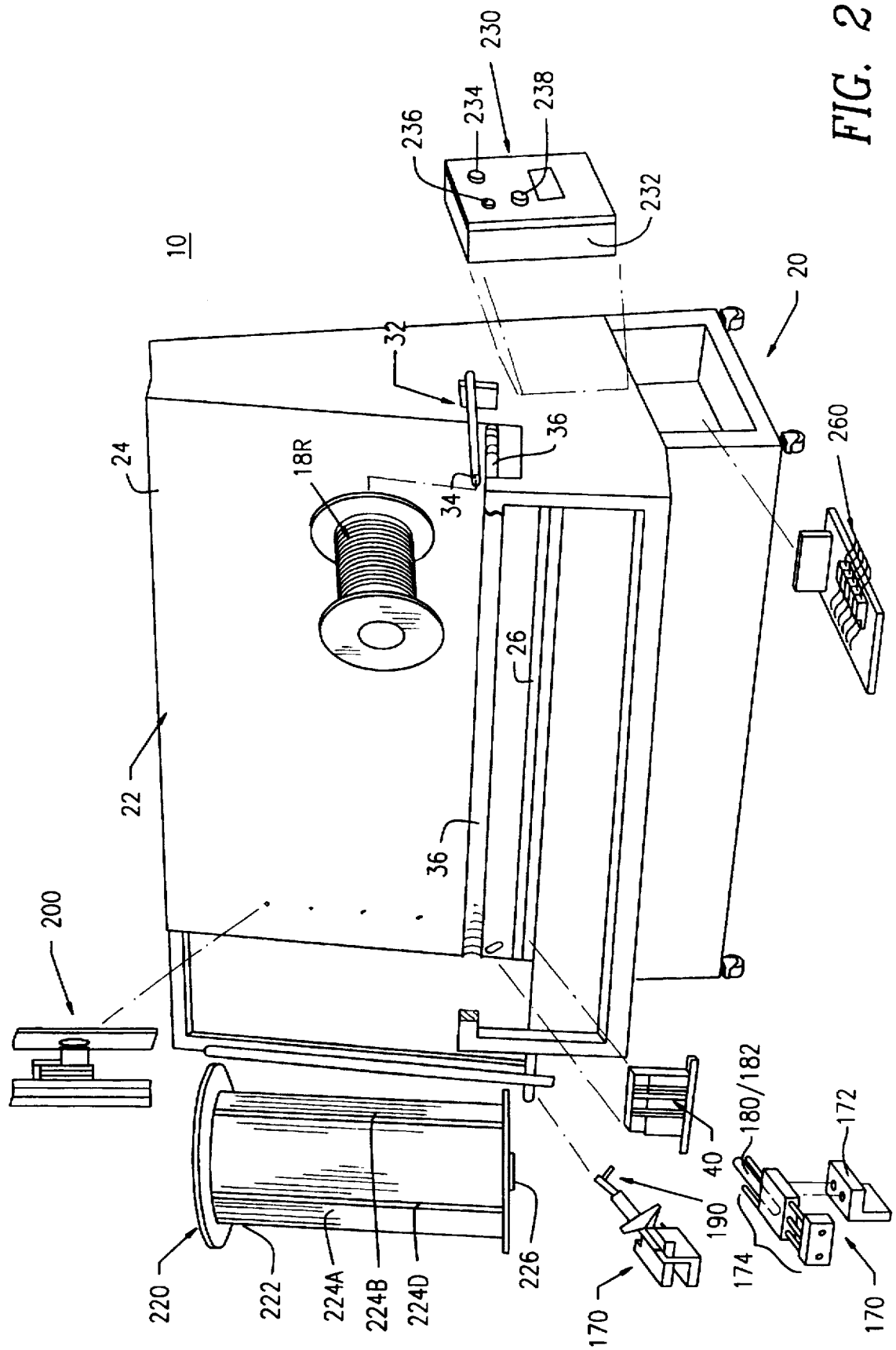
FIG. 2 is an exploded perspective view of the automated window screen assembly apparatus of the present invention showing all of the component assemblies thereof broken away.

As shown in FIGS. 1 and 2, the automated window screen assembly apparatus 10 includes a frame assembly 20 for mounting a spline head assembly 40 having multiple sub-assemblies, a corner clamp assembly 170, a frame clamp assembly 190, a screen roll cutter assembly 200, a screen roll feed holder assembly 220, an electronic control panel 230 and an electro-pneumatic air system 260.

Figure 21:
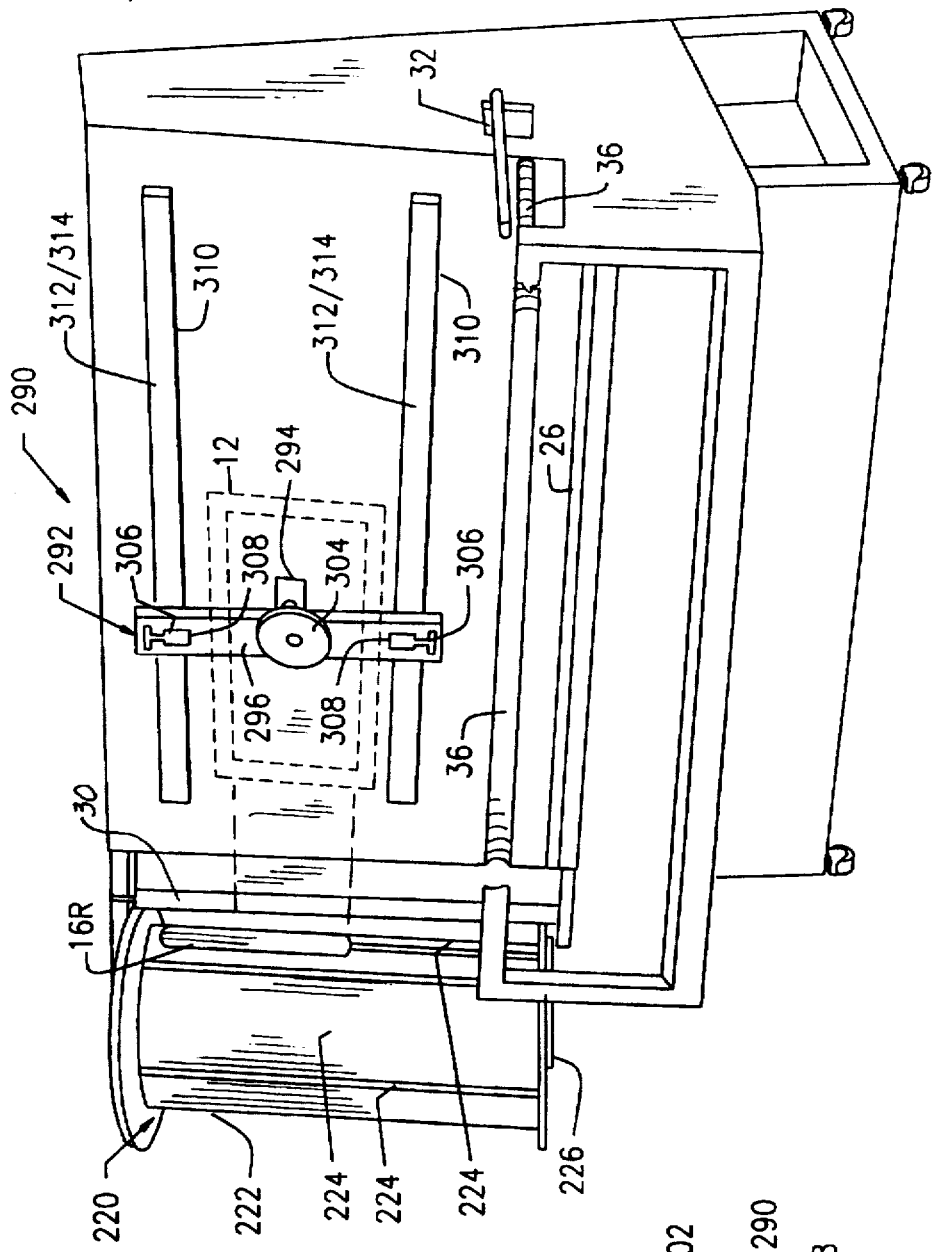
FIG. 21 is a front perspective view of the automated window screen assembly apparatus of the present invention showing the screen frame rotational assembly and its component parts contained therein, and the rotational arm in operational use.
Figure 21A:
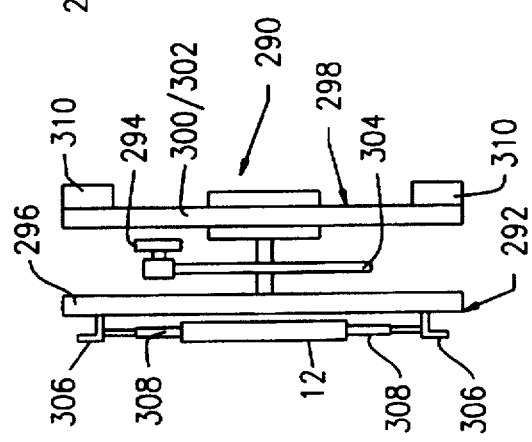
FIG. 21A is a side elevational view of the automated window screen assembly apparatus of the present invention showing the screen frame rotational assembly holding a screen frame.
Figure 22:
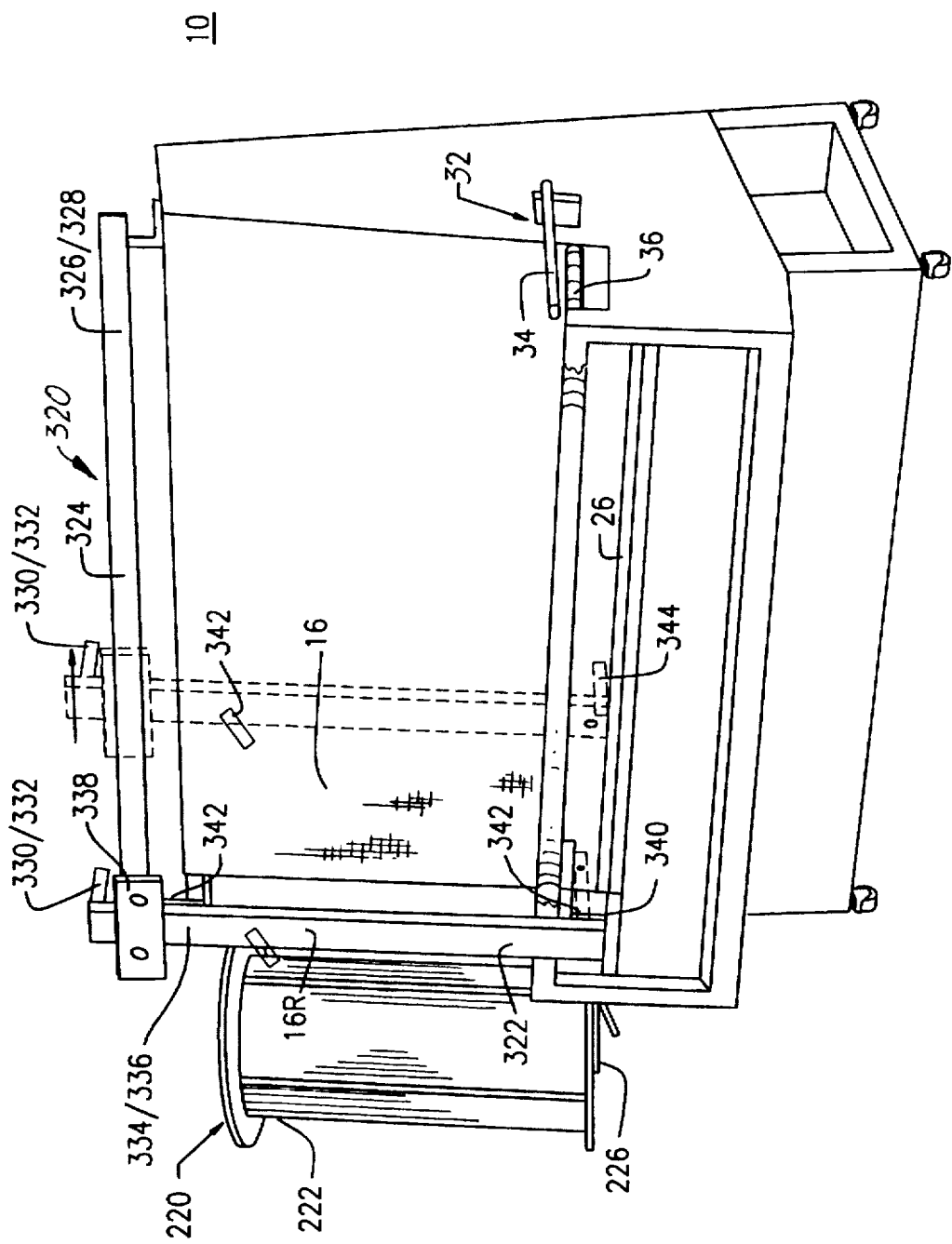
FIG. 22 is a front perspective view of the automated window screen assembly apparatus of the present invention showing the screen material advance assembly and its component parts contained therein; and the screen material arm holding device in operational use.

In addition, assembly apparatus 10 can include optional features in which to completely automate the window screen assembly process by including a screen frame rotational assembly 290 and a screen material advance assembly 320, as shown in FIGS. 21, 21A, and 22.

Frame Assembly 20

Figure 3:
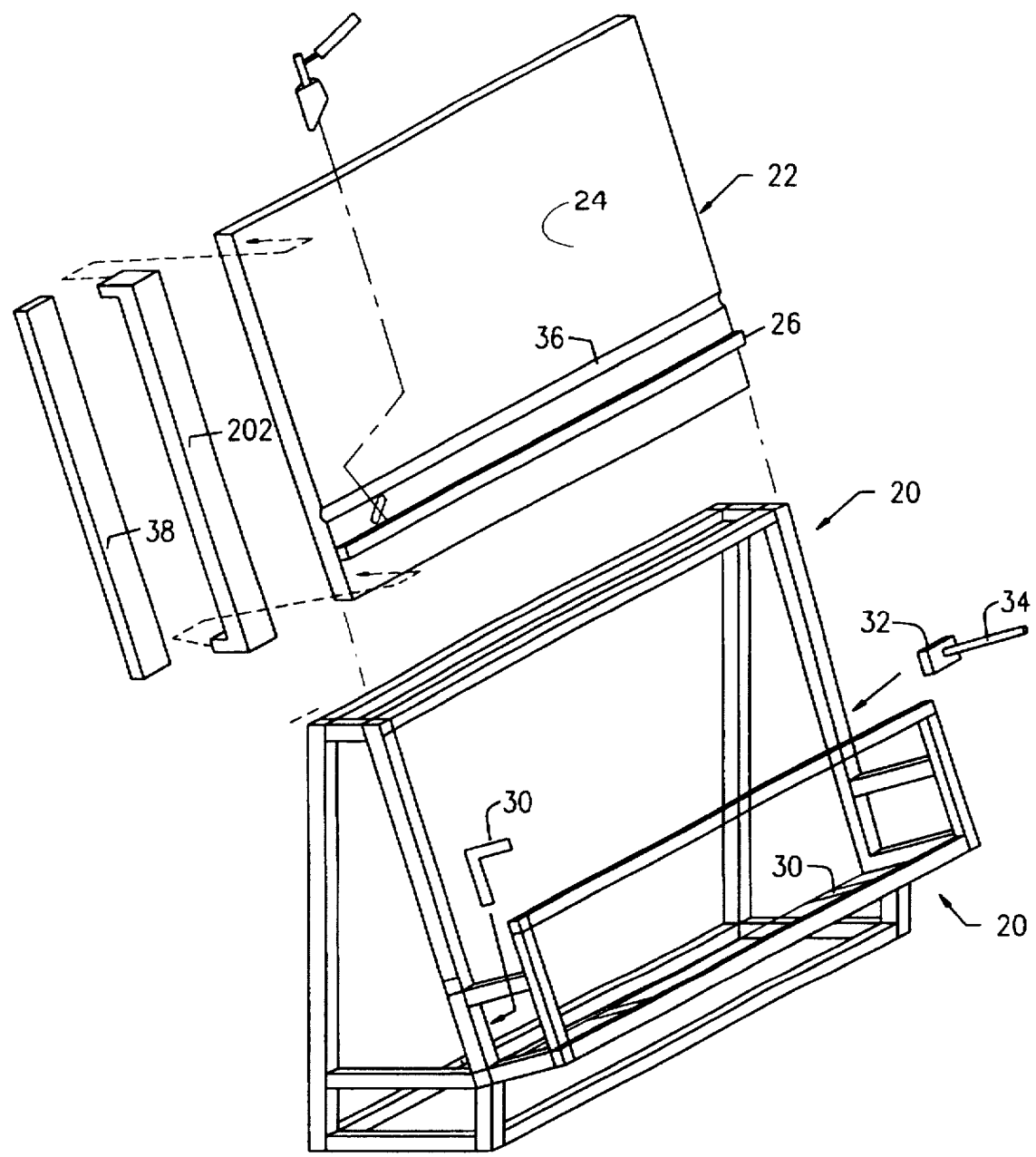
FIG. 3 is an exploded perspective view of the automated window screen assembly apparatus of the present invention showing the frame assembly component and its parts contained thereon.

The frame assembly 20 is used for the precise holding and placement of a window screen frame 12 on the vertical screen splining table 22, as shown in FIG. 1, 2, and 3. Splining table 22 includes a vertical surface wall 24 having a U-shaped, horizontal surface wall grooved channel 36 which is used for the proper tensioning of screen material 16 within screen frame 12, a horizontal ledge wall 26 and a vertical screen guide pinch plate 38 which are used for the holding and placement of a window screen frame 12 against the vertical splining table 22. Vertical surface wall 24 is slightly skewed from the perpendicular so as to lean the screen frame 12 against the surface wall 24 and horizontal ledge wall 26 of splining table 22, so that screen frame 12 does not fall off when the assembly apparatus 10 is in operation. Wall grooved channel 36 in conjunction with the slack wheel sub-assembly 100 provide a preset amount of slack in the screen material 16, so as not to over tighten the screen material 16 when assembled within screen frame 12. In addition, vertical splining table 22 includes a frame positioning clamp 28 for securing the screen frame 12 against both the horizontal ledge wall 26 and the vertical screen guide pinch plate 38 to ensure proper alignment of the screen frame 12 which will give the precise and proper insertion of the corner clamp 178 and splining wheel 140 into the screen retaining channel 14 of screen frame 12. Slide support guide brackets 30 are for mounting and positioning the timing belt slide guide 52 on the screen frame 12. Frame assembly 20 also includes a spline roll holder 32 with a spindle 34 having spline material 18 thereon for supporting and positioning the spline roll 18R so that the spline material 18 is aligned with the lower edge 12S of screen frame 12; and the spline 18 is also parallel and adjacent to the horizontal ledge wall 26 for ease of movement of spline 18.

Further, the frame assembly 20 houses and supports the various component assemblies that include the spline head assembly 40, the corner clamp assembly 170, the frame clamp assembly 190, the screen roll cutter assembly 200, the screen roll feed holder assembly 220, the electronic control panel 230 and the electro-pneumatic air system 260.

Spline Assembly 40

Figure 4:
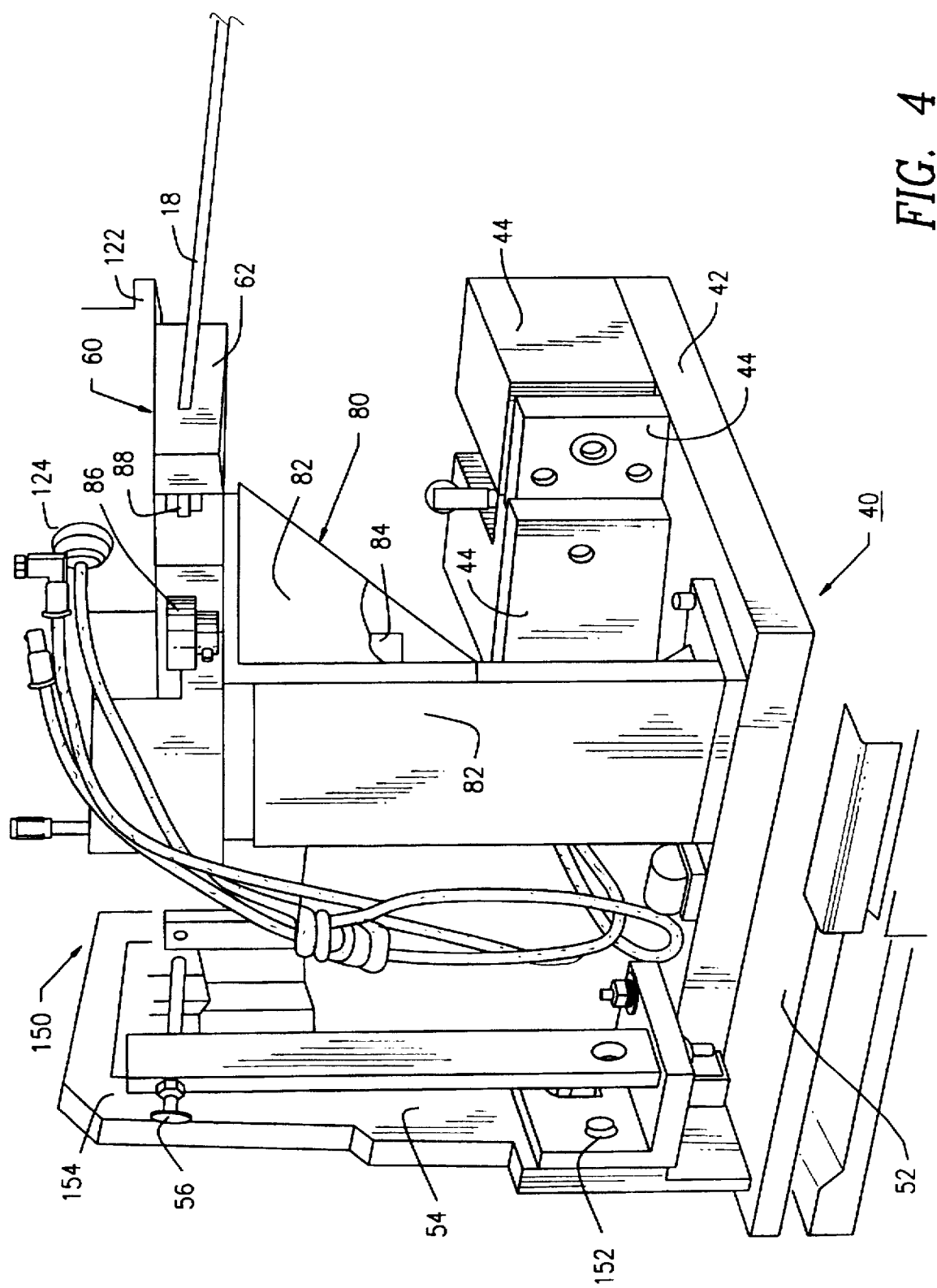
FIG. 4 is a perspective view of the automated window screen assembly apparatus of the present invention showing the spline head assembly in operational use.
Figure 5:
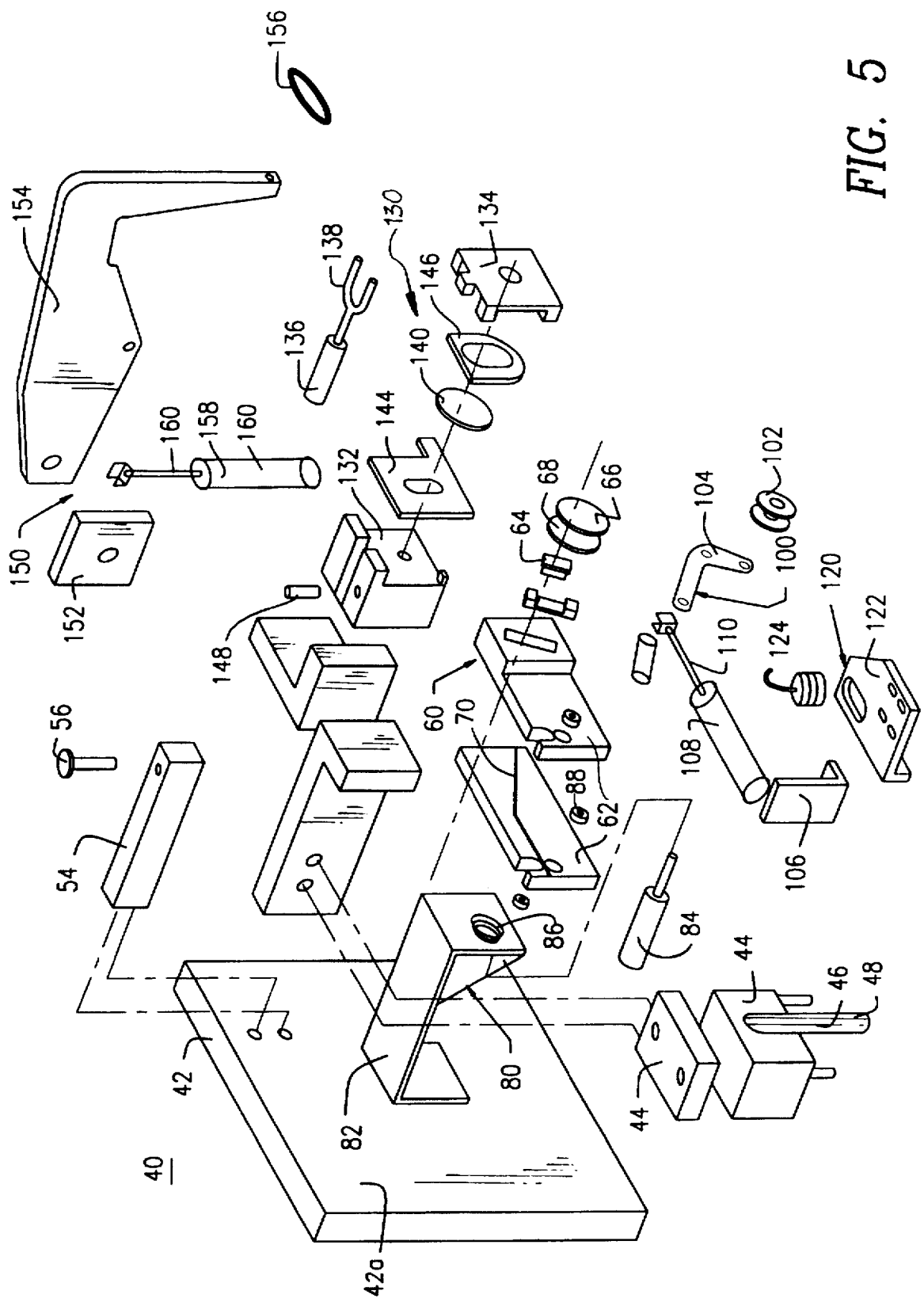
FIG. 5 is an exploded perspective of the automated window screen assembly of the present invention showing the spline head assembly and its component sub-assemblies thereof broken away.

The spline head assembly 40, as shown in FIGS. 2, 4, and 5, is used for guiding, inserting and cutting the spline material 18; inserting the spline material 18 and the screen material 16 into the screen retaining channel 14 of window frame 12W; and the trimming of excess screen material 16 off of the screen frame 12. The spline head assembly 40 includes a plurality of sub-assemblies including a spline cutter sub-assembly 60, a spline feed-advance sub-assembly 80, a slack wheel sub-assembly 100, a frame sensor sub-assembly 120, a spline wheel sub-assembly 130 and a screen cutter sub-assembly 150.

In addition, the spline head assembly 40 includes a carriage plate 42 being mounted to the timing belt slide guide 52 for the support of the spline head assembly 40; a pneumatic slide guide 44 with a DC motor 50 being connected to the timing belt slide guide 52 for moving of spline head assembly 40 along the timing belt slide guide 52; and a spline guide plate repositioning bracket 54 having an adjusting screw 56. Pneumatic slide guide 44 includes an air cylinder 46 and piston 48 for moving the slide guide 44 in a forward movement. Timing belt slide guide 52 includes an almost home sensor 58a, a home sensor 58b, and a maximum travel sensor 58c contained therein. Carriage plate 42 is used to mount the spline head assembly 40 and its sub-assemblies 60, 80, 100, 120, 130, and 150 to the timing belt slide guide 52. The spline guide plate repositioning bracket 54 is used to reposition the spline guide plates 144 and 146 into their normal guide position after the splining cycle is completed. Adjusting screw 56 on repositioning bracket 54 precisely adjusts the spline guide plates 144 and 146 for receiving the spline material 18 therein. DC motor 50 is used to drive the timing belt 52a on the timing belt slide guide 52 which in turn moves the spline head assembly 40 along the timing belt slide guide 52. Timing belt slide guide 52 is used to move the spline head assembly 40 along the bottom edge 12s of the window screen frame 12. The almost home sensor 58a is used to signal the computer control module 244 that the spline head assembly 40 is near the home position (near the lower left side, end corner 12B of screen frame 12) which will cause the corner clamp 178 to retract and spline head assembly 40 to slow down along the timing belt slide guide 52. The home sensor 58b is used to signal the computer control module 244 that the spline head assembly 40 has reached the home position (the lower left side, end corner 12B of screen frame 12) and stop the spline head assembly 40 from further movement. The maximum travel sensor 58c is used to signal the computer control module 244 in the event that the spline head assembly 40 has moved along the timing belt slide guide 52 too far, as shown in FIG. 4 of the drawings.

Figure 6:
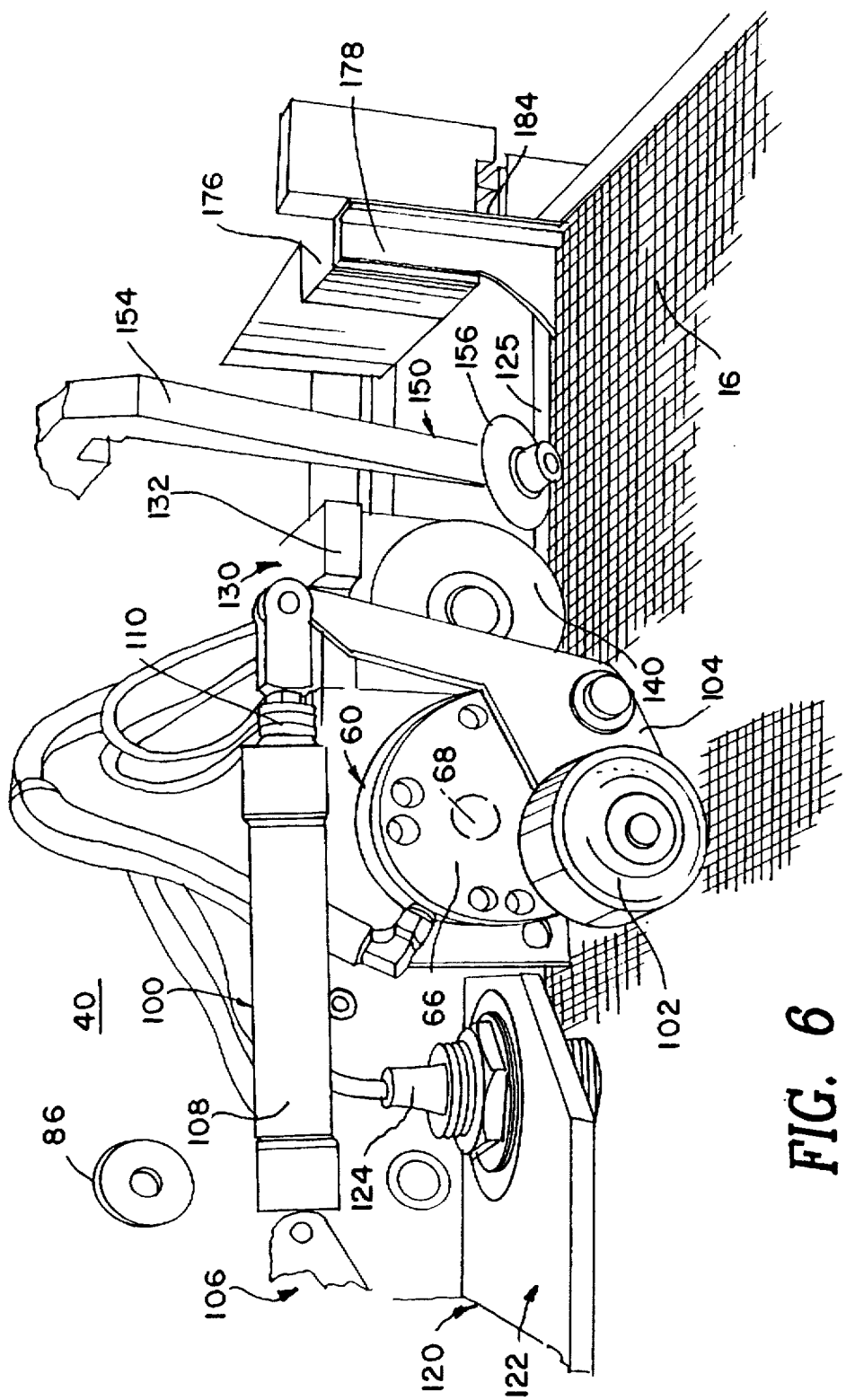
FIG. 6 is a top perspective view of the automated window screen assembly apparatus of the present invention showing the spline cutter sub-assembly, slack wheel sub-assembly, frame sensor sub-assembly, spline wheel sub-assembly and screen cutter subassembly with their component parts contained therein; and in operational use.
Figure 7:
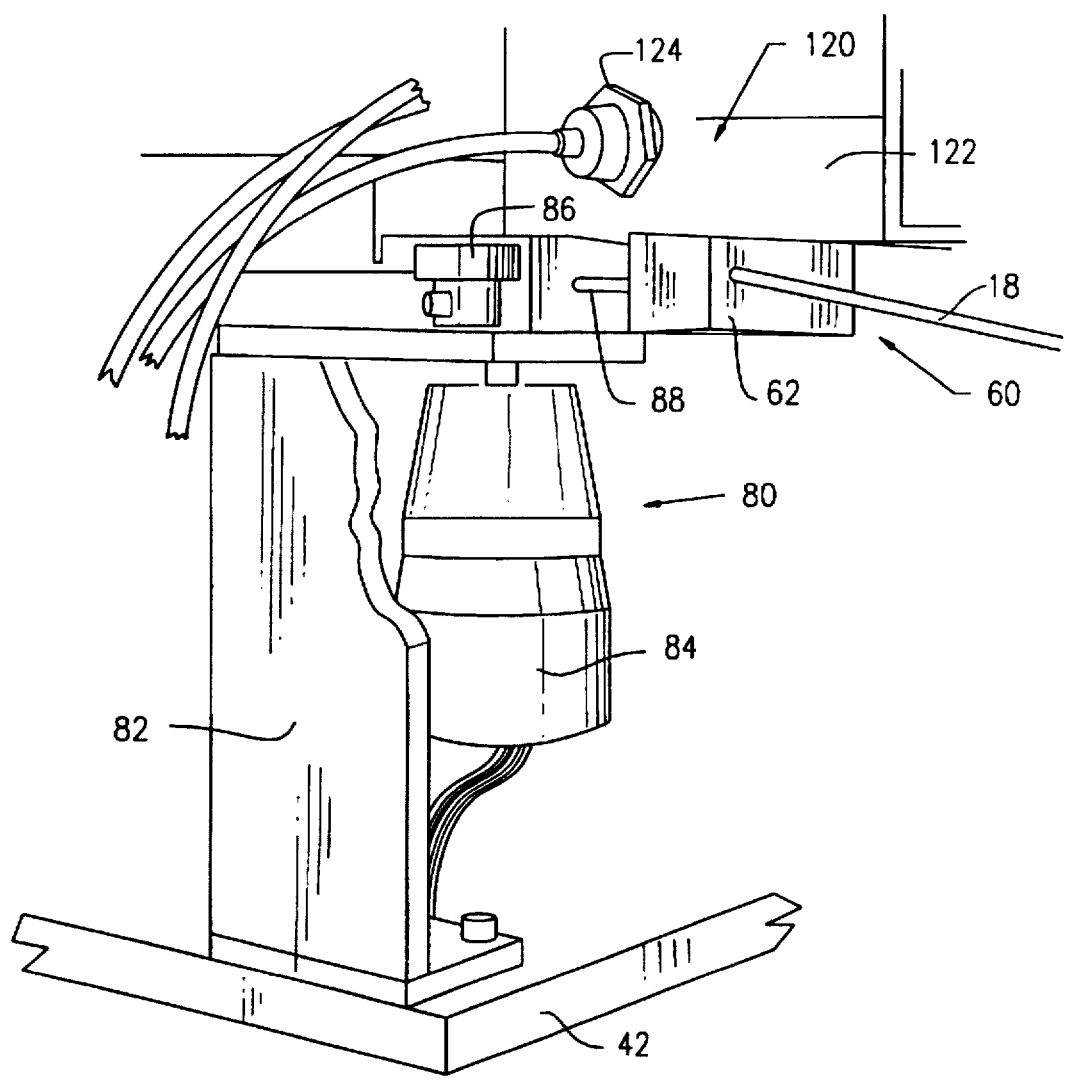
FIG. 7 is a front perspective view of the automated window screen assembly apparatus of the present invention showing the spline feed-advance sub-assembly and frame sensor sub-assembly with their component parts contained therein; and in operational use.

Spline head assembly 40 is mounted on the top surface wall 42a of carriage plate 42, as shown in FIGS. 4, 5, and 6, such that screen cutter sub-assembly 150 is adjacent to the spline wheel sub-assembly 130; the spline wheel sub-assembly 130 is adjacent to the slack wheel sub-assembly 100; the slack wheel sub-assembly 100 is adjacent to the spline cutter sub-assembly 60; the spline cutter sub-assembly 60 is adjacent to the frame sensor sub-assembly 120; the frame sensor sub-assembly 120 is adjacent to the spline feed advance sub-assembly 80; and both the screen cutter sub-assembly 60 and spline feed-advance sub-assembly 80 are adjacent to the top wall surface 42a of carriage plate 42.

Spline Cutter Sub-Assembly 60

Figure 20:
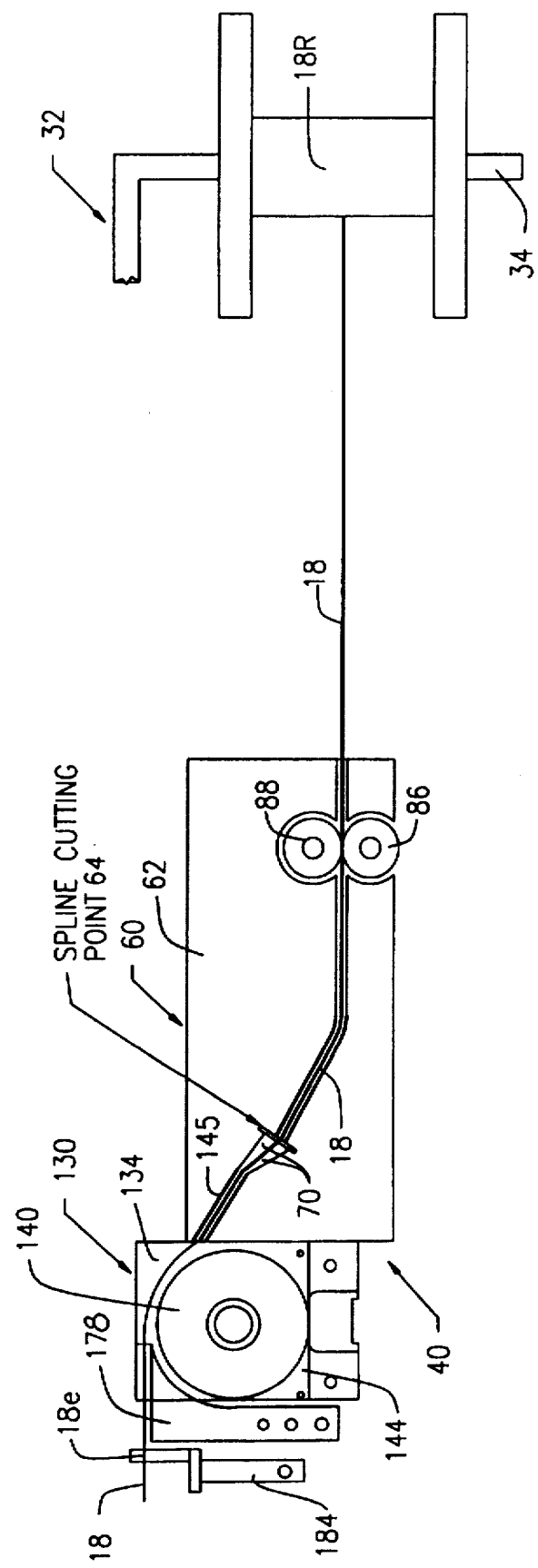
FIG. 20 is a cross-sectional top plan view of the spline cutter sub-assembly taken along lines A—A of FIG. 6 of the present invention showing the complete spline path from the spline roll to the insertion into the screen frame.

The spline cutter sub-assembly 60, as shown in FIGS. 4, 5, and 6, is used for cutting the spline 18 at the right side, end corner 12A of the window frame 12W which is done after the screen frame sensor 124 has sensed the end corner 12A of the window frame 12W. Spline cutter sub-assembly 60 includes a spline cutter housing 62, a knife blade 64, an air cylinder 66 and piston 68 for inserting and pushing the knife blade 64 through the spline material 18 and cutting the spline 18. As shown in FIG. 20, spline cutter sub-assembly 60 further includes a recessed groove 70 within housing 62 for guiding and holding the spline 18 in position, as the spline 18 passes through the spline cutter housing 62. Spline cutter housing 62 is used for guiding the spline 18 towards the spline wheel 140 and to house and hold the knife blade 64 and air cylinder 66 in which to cut the spline 18. Air cylinder 66 when activated, pushes the piston 68 outwardly which in turn pushes the knife blade 64 through the spline 18 thereby cutting it.

Spline Feed-Advance Sub-Assembly 80

The spline feed-advance sub-assembly 80 as shown in FIGS. 4, 5, 7, and 20, is used for feeding the spline material 18 through the spline cutter housing 62 between the spline guide plates 144 and 146, under the splining wheel 140 and into the L-shaped spline corner cutting component 184 after a cycle has been completed and the next cycle is about to start. Spline feed-advance sub-assembly 80 includes a motor support bracket 82 for holding a DC motor 84, a drive pinch wheel 86 and an idler pinch wheel 88. The drive pinch wheel 86 is mounted directly on the DC Motor 84 and is used for actively pushing the spline material 18 forward through the spline cutter housing 62. The idler pinch wheel 88 is used to hold the spline material 18 against the drive pinch wheel 86, such that the spline 18 does not shift or move.

Slack Wheel Sub-Assembly 100

Figure 8:
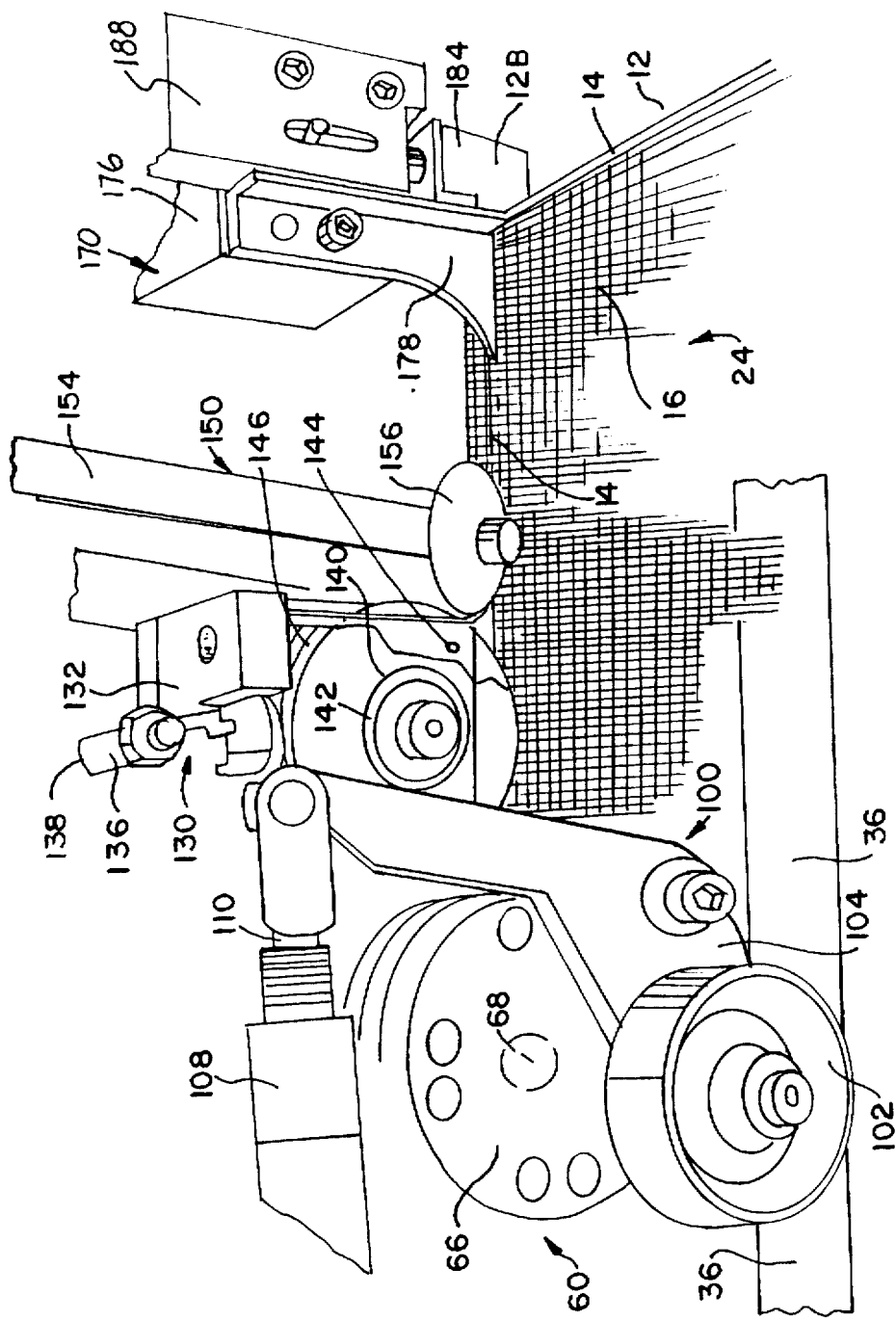
FIG. 8 is a top perspective view of the automated window screen assembly apparatus of the present invention showing the slack wheel sub-assembly spline wheel sub-assembly and screen cutter sub-assembly with their component parts contained therein; and in operational use.

The slack wheel sub-assembly 100, as shown in FIGS. 4, 5, and 8, is used for providing a predetermined amount of slack tension in the screen material 16 as it is being splined so as not to overtighten the screen material 16 in the window screen frame 12 as it is being assembled. Slack wheel sub-assembly 100 includes a tension wheel 102, a pivot bracket 104, an air cylinder bracket 106, an air cylinder 108 and a piston 110. Tension wheel 102 pushes the screen material 16 into the horizontal grooved channel 36 of vertical surface wall 24 which produces a predetermined amount of slack in the screen material 16. This slack is then taken up by the insertion of the spline 18 and screen material 16 into the screen retaining channel 14 of screen frame 12. Pivot bracket 104 is used to mount the tension wheel 102 within screen material 16 and provides the moving arm which pivots the tension wheel 102 in and out of the horizontal grooved channel 36 on vertical surface wall 24. Air cylinder 108 and piston 110 in conjunction with pivot bracket 104 move the tension wheel 102 in and out of the grooved channel 36 on vertical surface wall 24.

Frame Sensor Sub-Assembly 120

Figure 9:
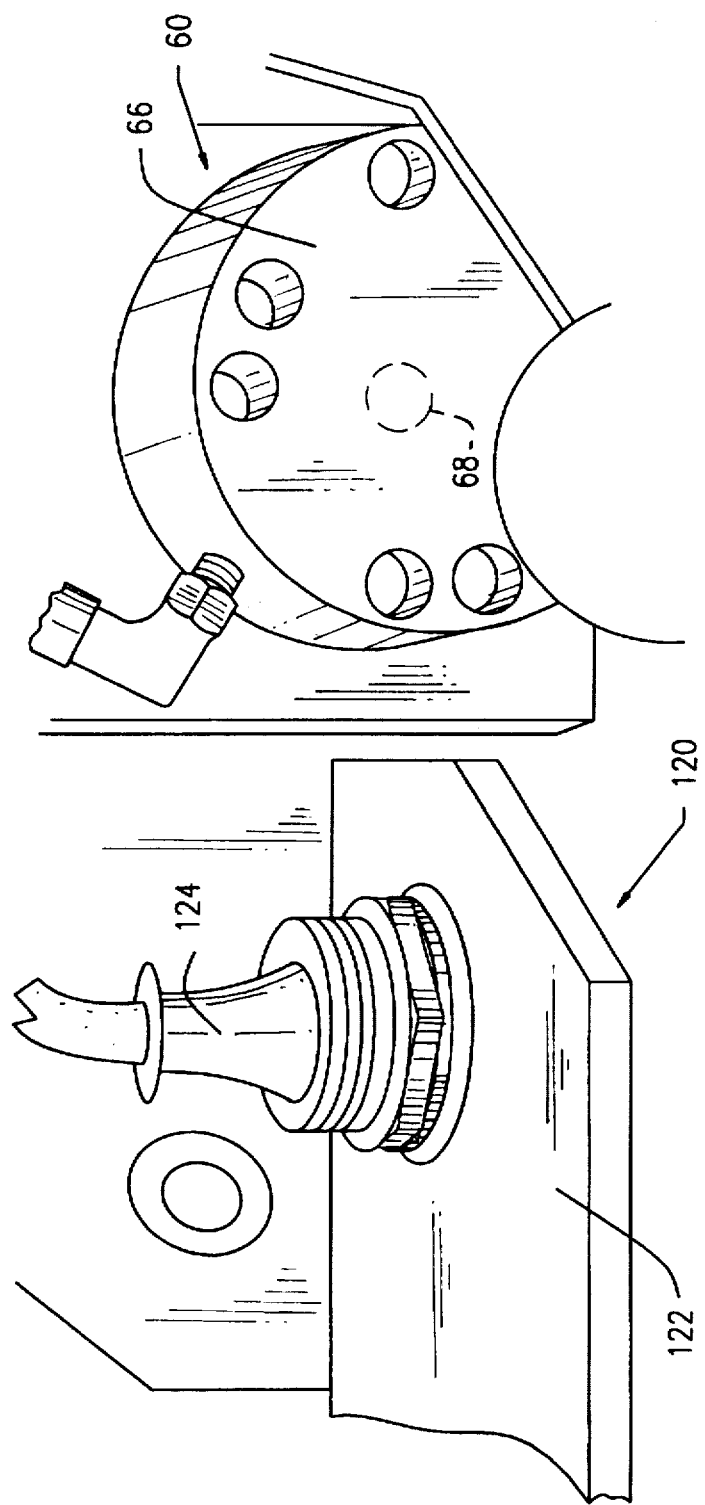
FIG. 9 is an enlarged perspective view of the automated window screen assembly apparatus of the present invention showing the frame sensor sub-assembly and the spline cutter sub-assembly with their component parts contained therein.

The frame sensor sub-assembly 120, as shown in FIGS. 4, 5, and 9, is used for determining the size of frame 12 such that the frame sensor 124 detects the end 12A of the frame 12, causing the spline head assembly 40 to complete the splining insertion and then to return to the home position which completes the splining cycle, so that the next cycle of splining may begin. The frame sensor sub-assembly 120 includes a frame sensor mounting bracket 122 for mounting the frame sensor 124. Frame sensor 124 is an electronic device that senses the size of the different screen frames 12.

Spline Wheel Sub-Assembly 130

Figure 10:
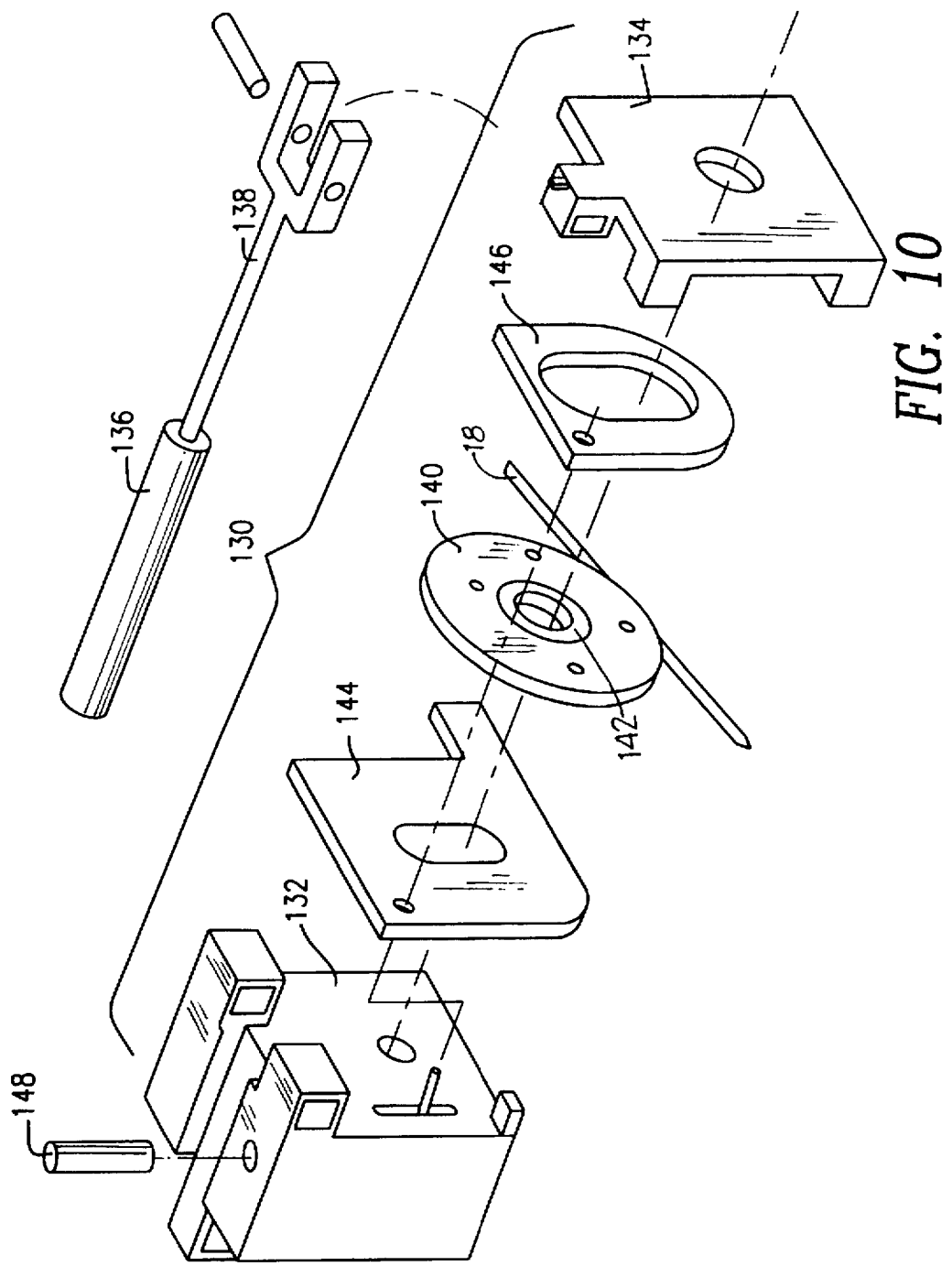
FIG. 10 is an exploded perspective view of the automated window screen assembly apparatus of the present invention showing the spline wheel sub-assembly and its component parts contained therein.

The spline wheel sub-assembly 130, as shown in FIGS. 4, 5, and 10, is used for guiding and aligning the spline 18 and the screen 16 into the screen retaining channel 14 of the window frame 12W. Spline wheel sub-assembly 130 includes a spline wheel mounting block housing 132, a spline guide door 134 having an air cylinder 136 and piston 138, a spline wheel 140, a spline wheel bearing 142 and a pair of spline guide plates 144 and 146. Spline wheel mounting block housing 132 provides the mounting means on which all of the component parts 134, 136, 140, 142, 144, and 146 of spline wheel sub-assembly 130 are mounted to. Spline guide door 134 is used to guide the spline 18 under the spline wheel 140. As shown in FIG. 8, spline wheel 140 is used to roll the spline material 18 and screen material 16 into the screen retaining channel 14 of frame 12. Upper and lower spline guide plates 144 and 146 form a guide channel 145 in which to guide the spline material 18 from the spline cutter housing 62 under the spline wheel 140 and corner clamp 178 and into the L-shaped spline corner cutting component 184.

Screen Cutter Sub-Assembly 150

Figure 11:
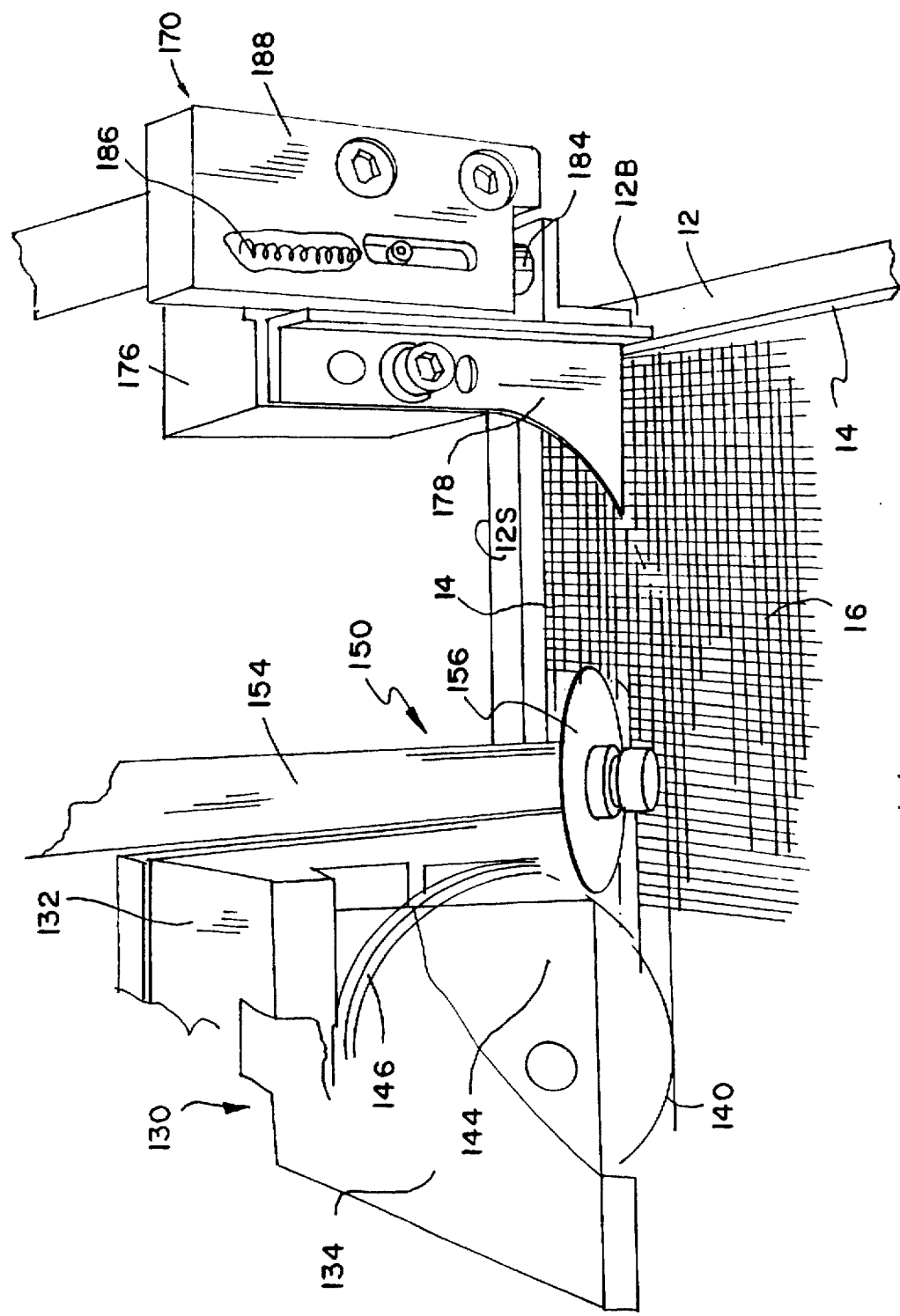
FIG. 11 is a top perspective view of the automated window screen assembly apparatus of the present invention showing the screen cutter sub-assembly and corner clamp cutting assembly with their component parts contained therein, and the screen cutter and corner cutter in operational use.

The screen cutter sub-assembly 150, as shown in FIGS. 4, 5, and 11, is used for cutting the excess screen material 16 off of the screen frame 12 after the spline material 18 and screen material 16 have been inserted in the screen retaining channel 14 of frame 12. Screen cutter sub-assembly 150 includes a pivot bracket mounting plate 152, a pivot bracket 154, a screen cutter wheel 156, an air cylinder 158 and a piston 160. Pivot bracket mounting plate 152 is used to mount the pivot bracket 154 to the carriage plate 42. Pivot bracket 154 is used to mount the screen cutter wheel 156 which provides proper placement and pivoting action for the screen cutter wheel 156 in cutting off excess screen material 16. Screen cutter wheel 156 is used to precisely cut the excess screen material 16 off of the screen frame 12 after it has been splined.

Corner Clamp Cutting Assembly 170

Figure 12:
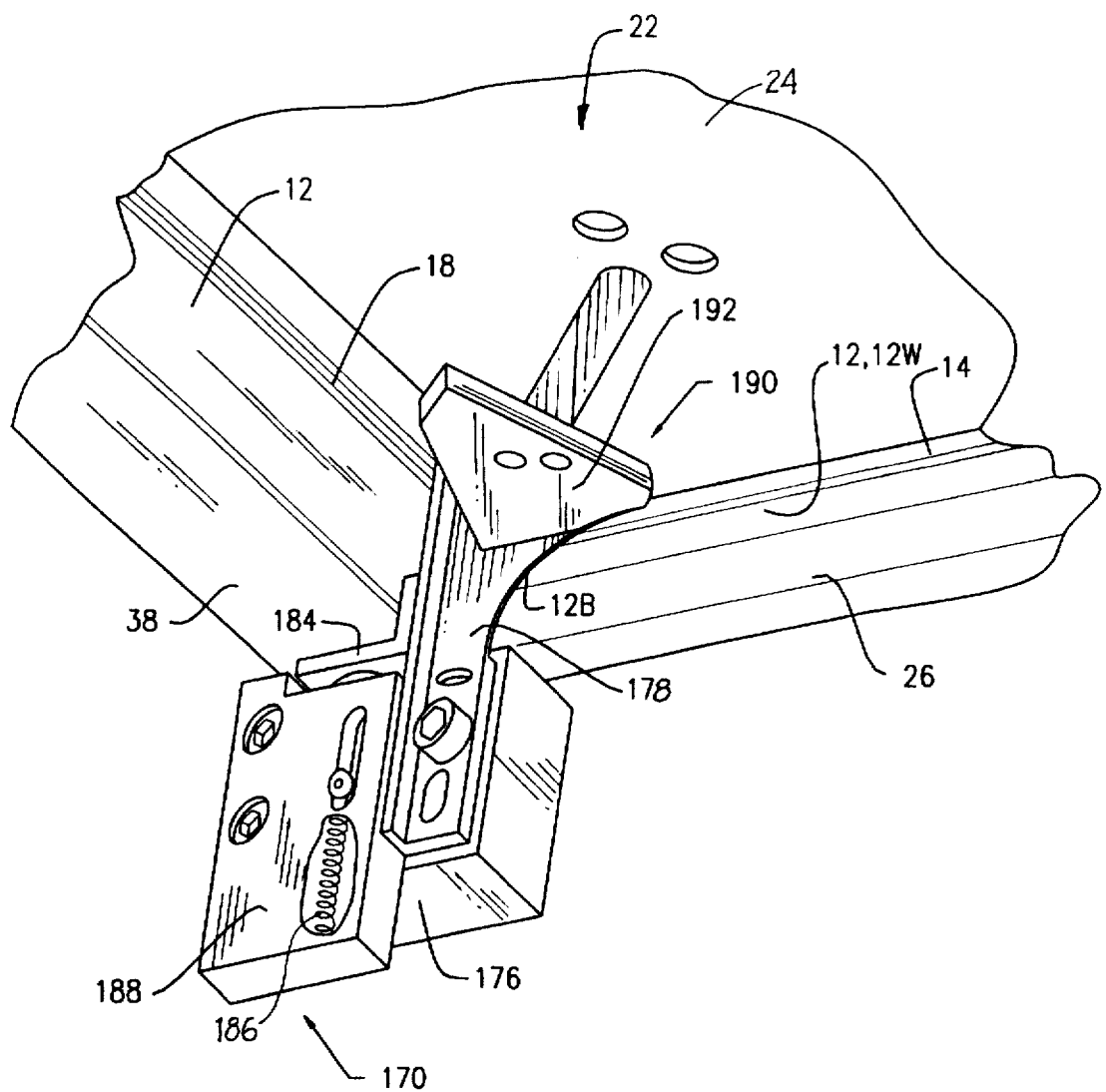
FIG. 12 is a top perspective view of the automated window screen assembly apparatus of the present invention showing the corner clamp cutting assembly and its component parts contained therein, and the corner clamp in operational use.

The corner clamp cutting assembly 170, as shown in FIGS. 1, 2, and 12, is used for the cutting of the spline material 18; and then inserting spline material 18 and screen material 16 into the left side, end corner 12B of the window frame 12W. The corner clamp assembly 170 includes a pneumatic slide guide mounting bracket 172, a pneumatic slide guide 174 having an air cylinder 180 and piston 182, a corner clamp mounting bracket 176, a corner clamp 178, an L-shaped spline corner cutting component 184, a spline corner cutting component spring 186, and a corner cutting mounting block 188. Corner cutting mounting block 188 contains cutting spring 186 and is used for holding the L-shaped corner cutting component 184 in place. Pneumatic slide guide mounting bracket 172 is used to mount the pneumatic slide guide 174 to the frame component assembly 40. The pneumatic slide guide is used to provide the clamping action by moving the corner clamp assembly 170 in and out of the screen retaining channel 14 of screen frame 12. The corner clamp mounting bracket 176 mounts the corner clamp 178 to the pneumatic slide guide 174. Corner clamp 178 inserts both the spline and screen materials 18 and 16, respectively, into the corner 12B of the window screen frame 12. The L-shaped corner cutting component 184 is used to hold the spline end 18e of spline material 18 prior to cutting it in the corner 12B. As the corner clamp 178 passes the L-shaped corner cutting component 184 the spline cutting action takes place. The spline corner cutting spring 186 provides the force to cut through the screen and spline materials 16 and 18 as previously mentioned.

Frame Clamp Assembly 190

Figure 13:
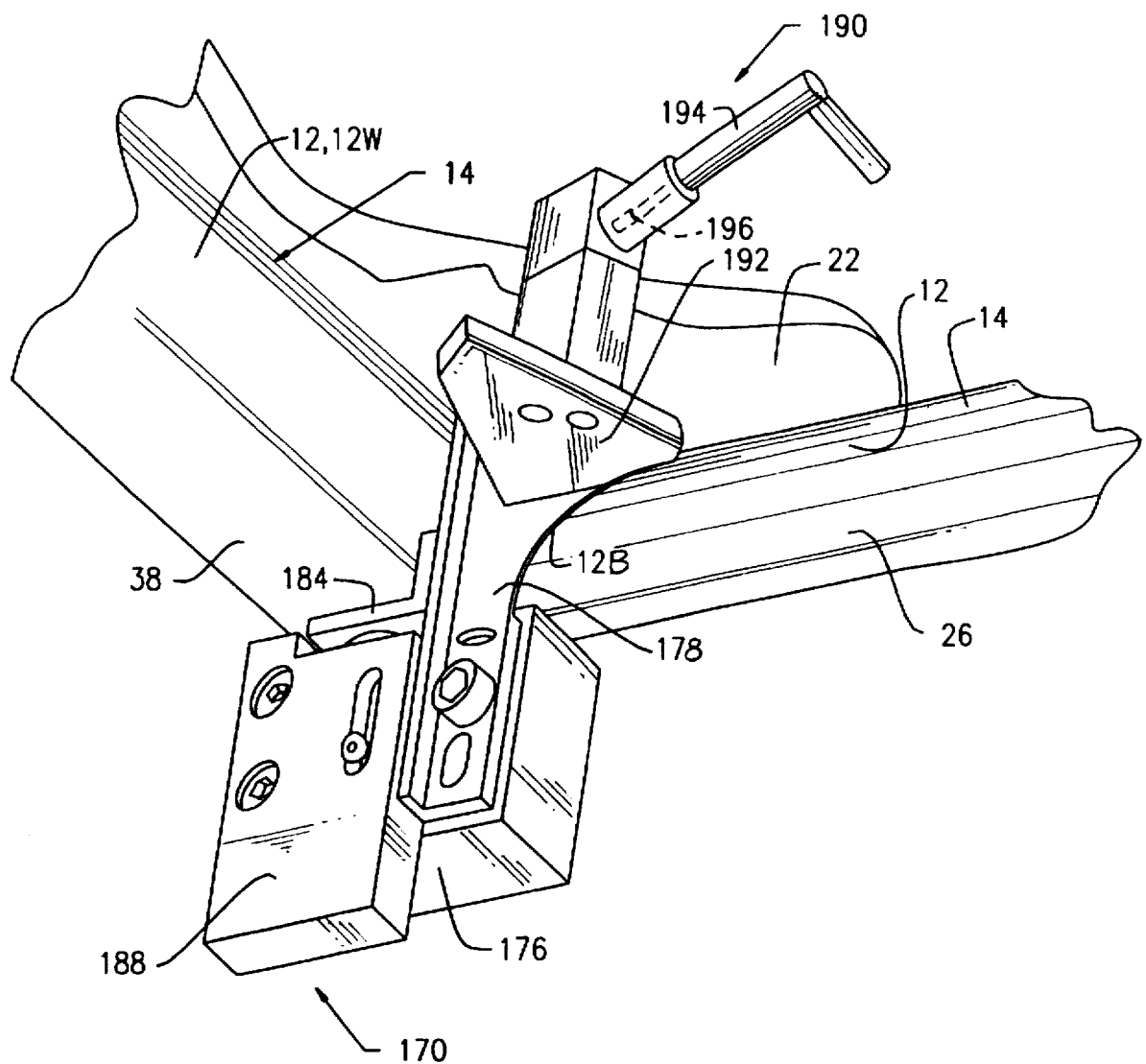
FIG. 13 is a top perspective view of the automated window screen assembly apparatus of the present invention showing the frame clamp assembly and its component parts contained therein.
Figure 14:
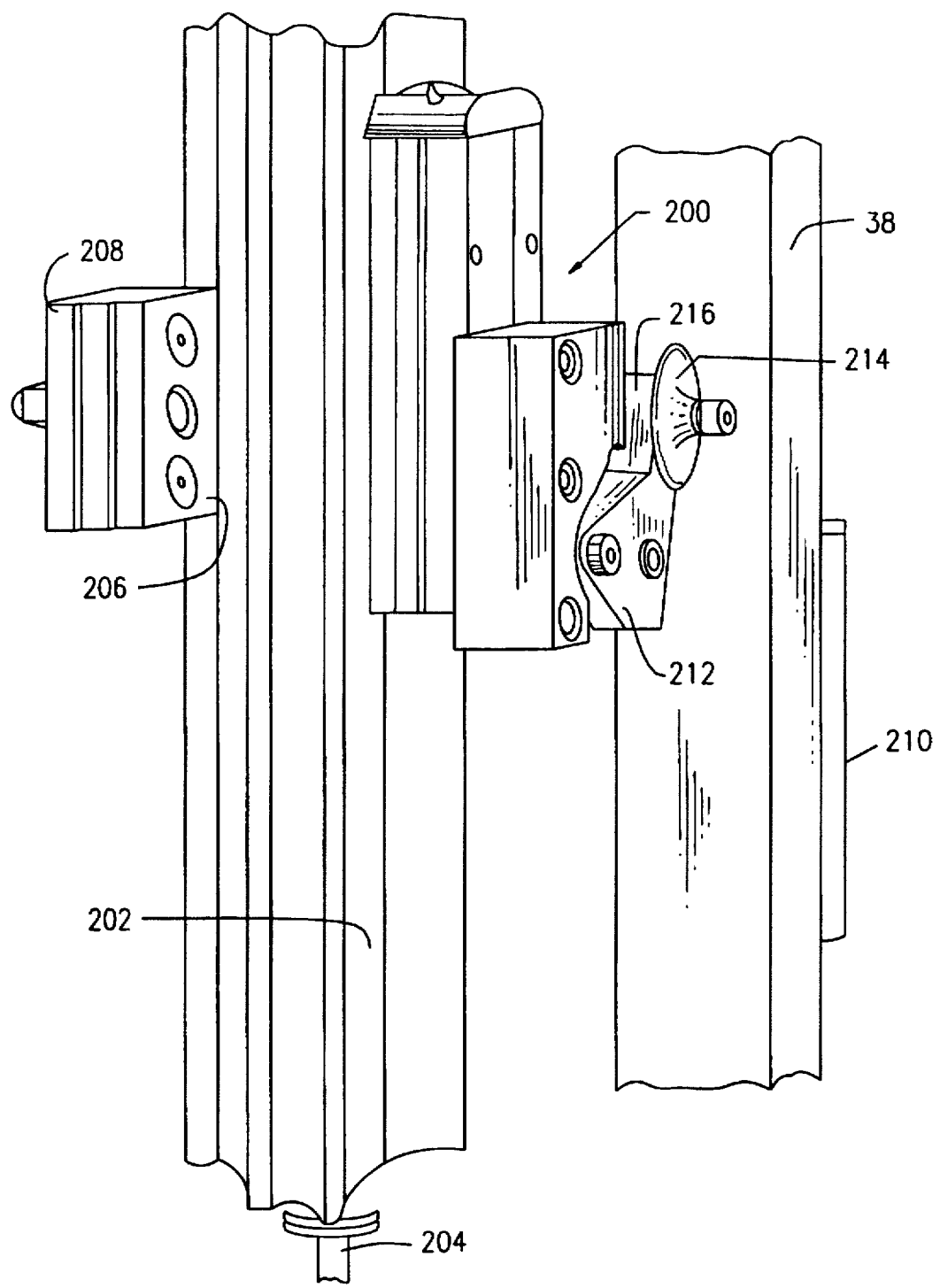
FIG. 14 is a front perspective view of the automated window screen assembly apparatus of the present invention showing the screen roll cutter assembly and its component parts contained therein, and the screen roll cutter in operational use.
Figure 15:
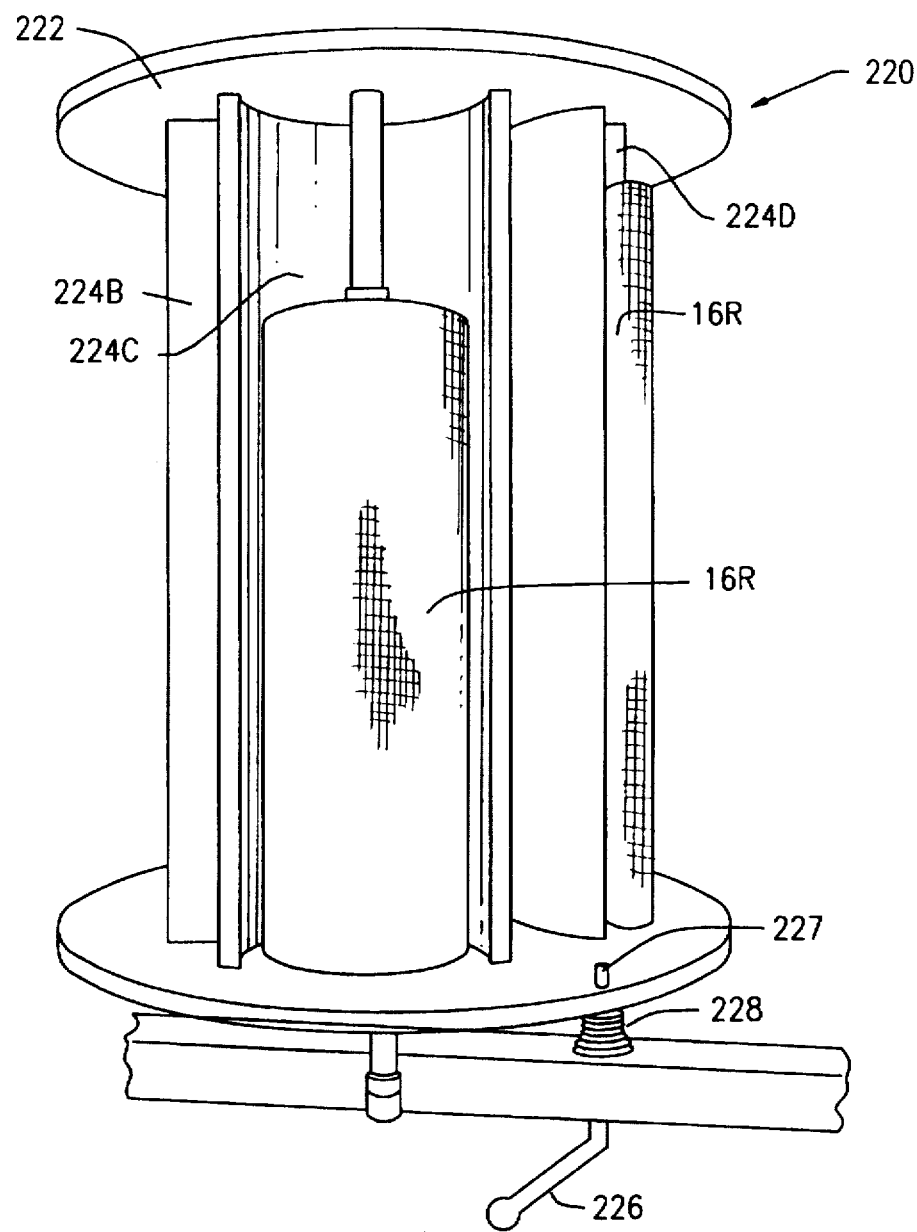
FIG. 15 is a front perspective view of the automated window screen assembly apparatus of the present invention showing the screen roll feed holder assembly and its component parts contained therein.
Figure 15A:
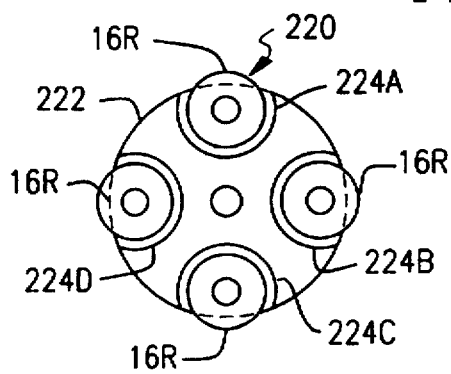
Figure 16:
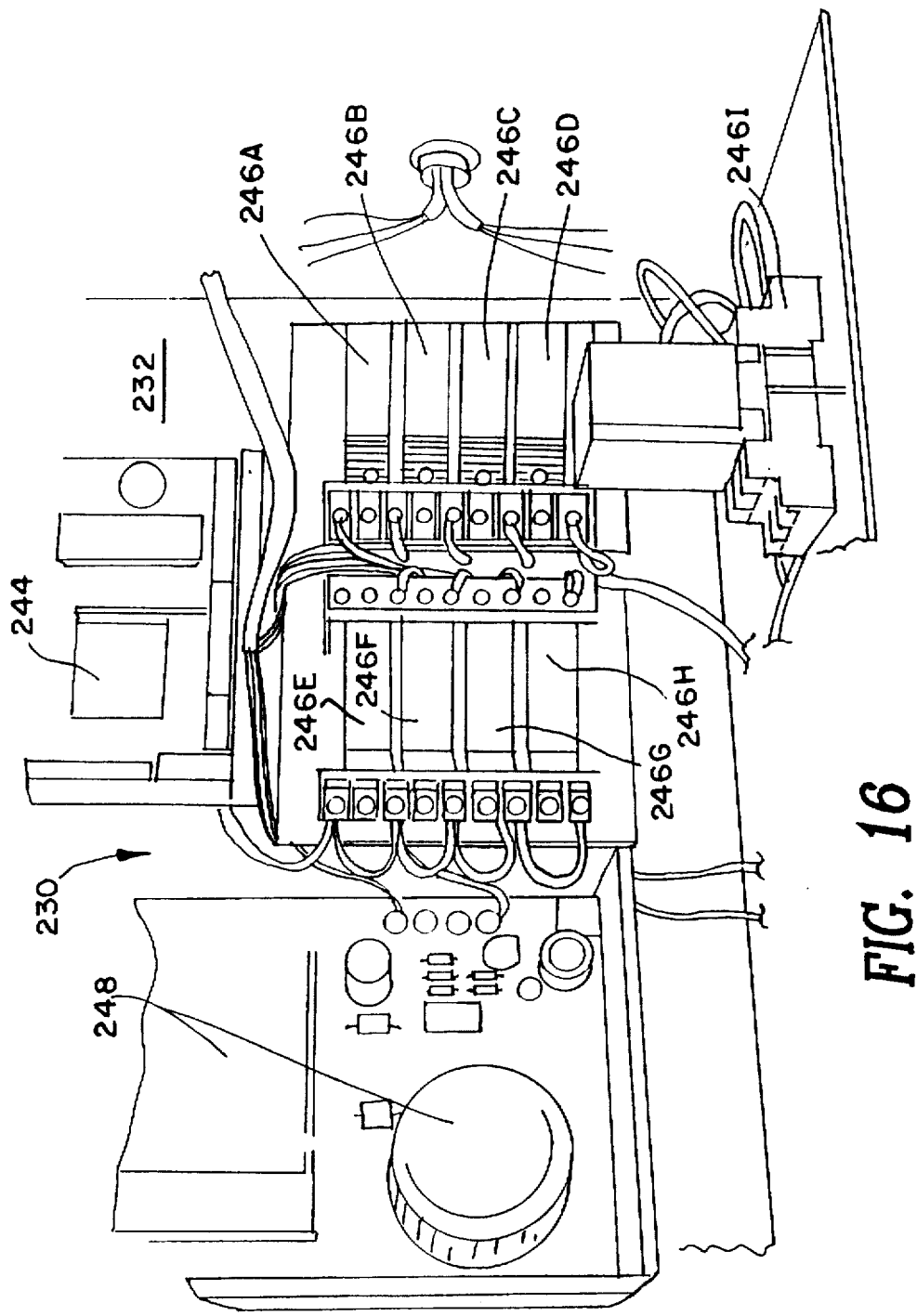
FIG. 16 is a front perspective view of the automated window screen assembly apparatus of the present invention showing the control panel housing and its component electronics contained therein.
Figure 17:
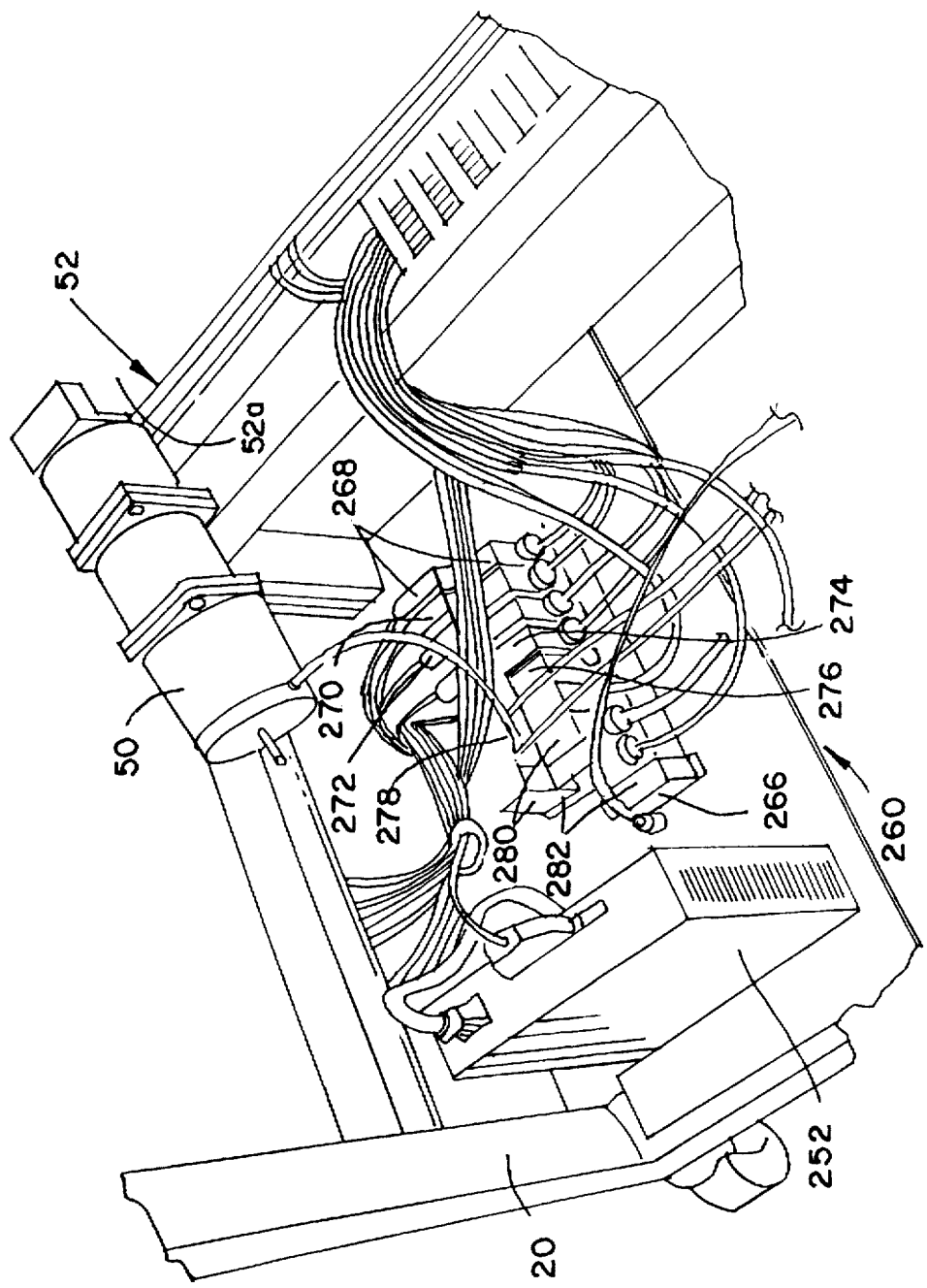
FIG. 17 is a front perspective view of the automated window screen assembly apparatus of the present invention showing the electro-pneumatic air system.
Figure 18:
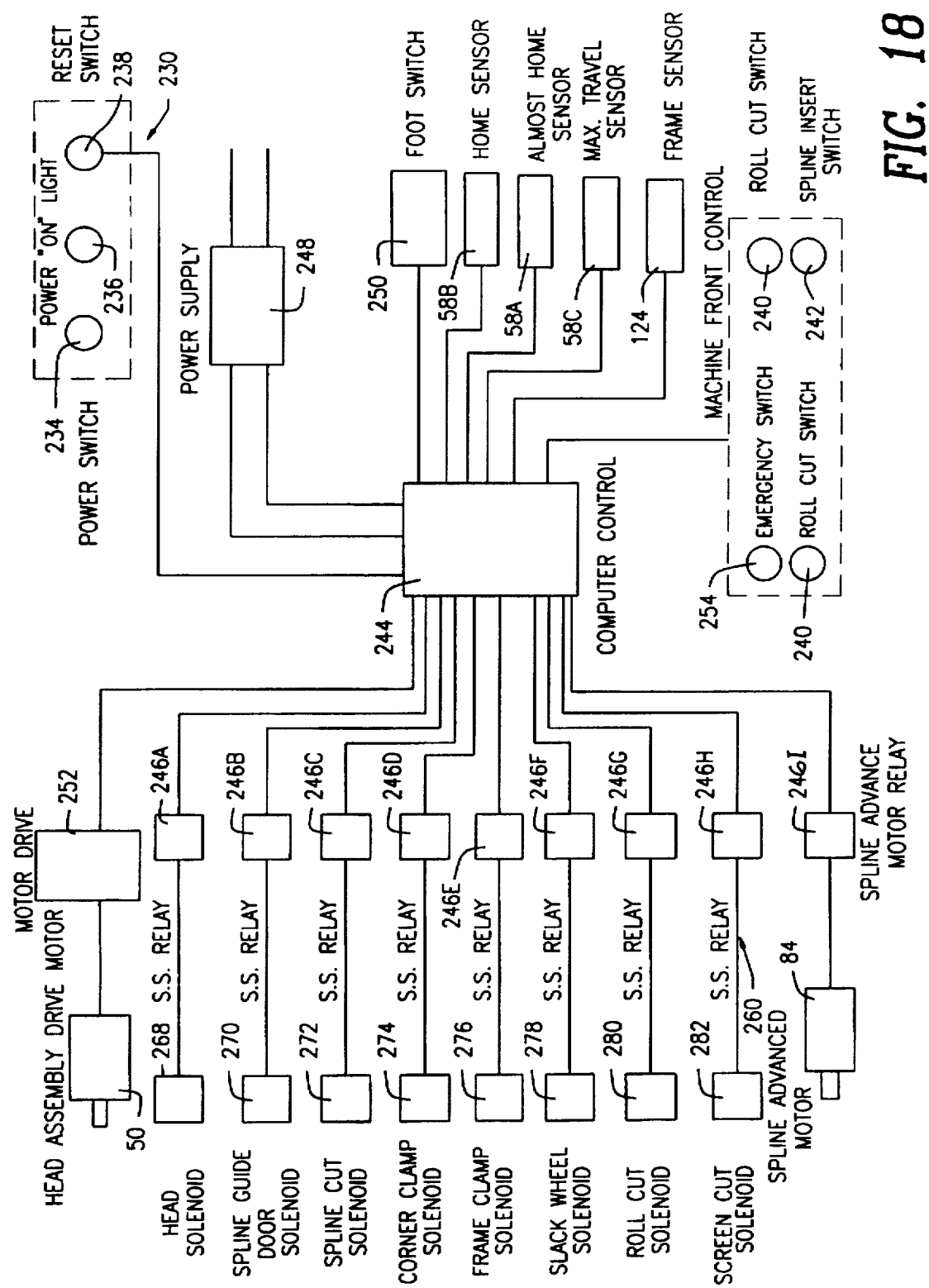
FIG. 18 is a schematic presentation of the automated window screen assembly apparatus of the present invention showing an electrical block diagram and its electrical components contained therein.

The frame clamp assembly 190, as shown in FIGS. 1, 2, and 13, is used for holding and positioning the window screen frame 12 on the splining table 22 in preparation for the splining cycle to begin. More particularly, frame clamp assembly 190 positions the window screen frame 12 against the horizontal ledge wall 26 and the vertical screen guide pinch plate 38. The frame clamp assembly 190 includes a frame guide clamp 192 having an air cylinder 194 and piston 196. The frame guide clamp 192 is the actual mechanism that does the positioning of the screen frame 12.

Screen Roll Cutter Assembly 200

The screen roll cutter assembly 200, as shown in FIGS. 1, 2, 14, and 15 is used for cutting the screen material 16 in a vertical direction from the screen roll 16R being held on the screen feed holder 222. The screen roll cutter assembly 200 includes a rodless air cylinder 202 and piston 204 having a pair of holding brackets 206 and 208, a screen guide pinch plate 210, a cutter wheel pivot bracket 212, a cutter wheel 214 and a cutter wheel spring 216. The rodless air cylinder 202 and piston 204 provides the mechanism to make the cutter wheel 214 travel along the screen guide pinch plate 210. The screen guide pinch plate 210 has two functions in which the first function is to provide a surface that cutter wheel 214 can roll against thereby producing a cutting action; and the second function is to provide the left side guide for the screen frame 12. The cutter wheel pivot bracket 212 is used to mount the cutter wheel 214 to the rodless air cylinder 202 and cutter wheel pivot bracket 212 such that the cutter wheel 214 is against screen guide pinch plate 210 to produce the cutting action. Cutter wheel spring 216 is mounted to the cutter wheel pivot bracket 212 and is used to provide the force to cut through the screen material 16.

Screen Roll Feed Holder Assembly 220

The screen roll feed holder assembly 220, as shown in FIGS. 1, 2, 15, and 15A is used for the holding of various types of screen material rolls 16R to be used in the assembly of the completed window screen frame 12. Screen roll feed holder assembly 220 includes a feeder holder housing 222 having a plurality of individual holding compartments 224A to 224D each for holding of a particular roll 16R of screen material 16, a lever clamp 226 for holding in place a particular holding compartment 224A to 224D, a lever clamp plunger 227 and a lever clamp spring 228. Holding compartments 224A to 224D are used to stop the individual screen rolls 16R from interfering with each other when the feeder holder housing 222 is rotated. Lever clamp 226, lever clamp plunger 227 and lever clamp spring 228 are used to lock the feeder holder housing 222 in place.

Electronic Control Panel 230

The electronic control panel 230, as shown in FIGS. 1, 2, 16, 17, and 18, provides the electronic controls for the aforementioned assemblies 20, 40, 170, 190, 200, and 220. The control panel 230 includes a panel housing 232 having a power switch 234, a power indicator light 236, a reset switch 238, a screen roll cutter switch 240, a spline insert switch 242, a power supply 248, a cycle start foot switch 250, a motor driver 252 and an emergency power switch 254. In addition, control panel 230 further includes a computer control module 244 having a plurality of solid state relays 246A to 246I for controlling the various assembly apparatus 10 machine functions, and a power supply 248 for supplying the electrical power for the aforementioned switches 234, 240, 242, 250, 252, and 254, computer control module 244, and solid state relays 246A to 246I.

Electro-Pneumatic Air System 260

Figure 19:
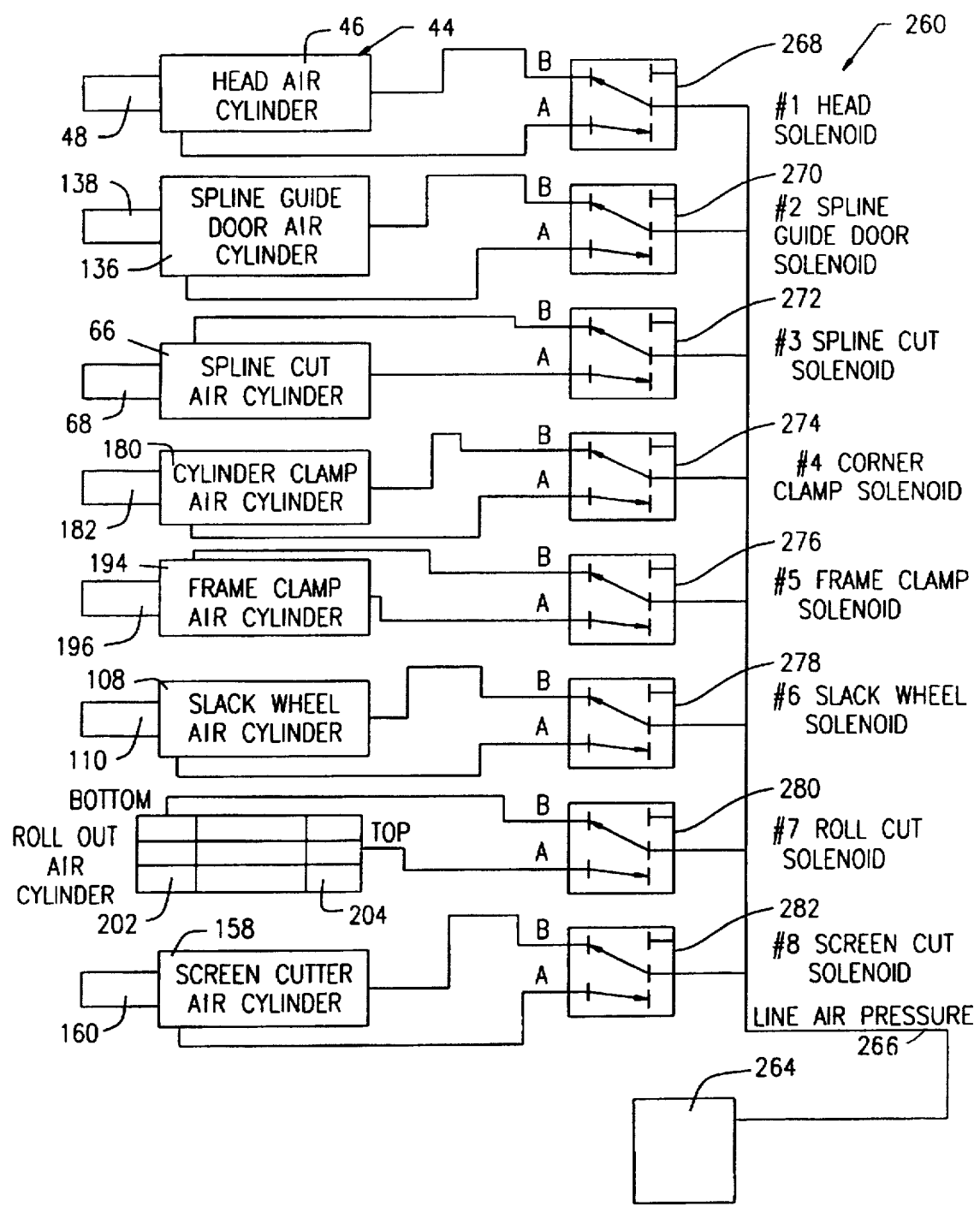
FIG. 19 is a schematic presentation of the automated window screen assembly apparatus of the present invention showing a pneumatic block diagram and its pneumatic parts contained therein.

The electro-pneumatic air system 260, as shown in FIGS. 1, 2, and 19, provides the pneumatic air in which to power the individual air cylinders and pistons 46, 48, 66, 68, 108, 110, 136, 138, 158, 160, 180, 182, 194, 196, 202, and 204 respectively, used in the assembly apparatus 10. The electro-pneumatic air system 260 includes a compressor 264 having a main compressor pressurized air line 266, and a plurality of solenoids being the head solenoid 268, the spline guide door solenoid 270 for operating spline guide door 134, the spline cut solenoid 272, the corner clamp solenoid 274, the frame clamp solenoid 276, the slack wheel solenoid 278, the roll cut solenoid 280 and the screen cut solenoid 282.

Screen Frame Rotational Assembly 290

Screen frame rotational assembly 290, as shown in FIGS. 21 and 21A, is used for the rotating of screen frame 12 at the end of each splining cycle of a frame side 12S, such that there is no operator intervention until the window screen 12W is completely done. Screen frame rotational assembly 290 includes a screen frame rotational housing 292, a DC rotational motor 294, a rotation arm 296, a vertical pneumatic slide guide 298 having an air cylinder 300 and piston 302, a rotation arm pivot bracket 304 having an arm holding component 306 for holding screen frame 12 while frame 12 is rotating. Rotational assembly 290 further includes a holder component air cylinder 308 and a horizontal pneumatic slide guide 310 having an air cylinder 312 and piston 314.

Screen Material Advance Assembly 320

Screen material advance assembly 320, as shown in FIG. 22, is used for advancing the screen material 16 from the screen roll 16R of feed holder housing 222 at the start of the splining cycle, such that the screen material 16 is pulled forward and held in place at corner 12D (upper right-side corner) of screen frame 12. Screen material advance assembly 320 includes a screen material advance housing 322, a pneumatic slide guide 324 having an air cylinder 326 and piston 328, a screen clamp air cylinder 330 and piston 332, a pair of pivot clamp brackets 334 and 336, pivot arm brackets 338 and 340 having a screen material arm holding component 342 for holding the screen material 16 while the screen material 16 is being advanced on the pneumatic slide guide 324. In addition, there is a frame sensor 344 for indicating when the screen material 16 has advanced to the end of the screen frame 12.

OPERATION OF THE PRESENT INVENTION

To set up the machine, the operator loads at least one screen roll into the screen roll holder 220 located on the left of the machine. Screen roll holder 220 has holding compartments 224A to 224D each for receiving an individual screen roll 16R. The screen rolls 16R are then placed into the plurality of individual holding compartments 224A to 224D of feeder housing 222. The operator then adjusts lever clamp 226 to a given holding compartment 224A, such that the screen material 16 from the screen roll feed holder assembly 220 is ready to be used. The operator then loads the spline roll 18R on the spindle 34 of spline roll holder 32, where spline material 18 is then fed into the spline feed-advance sub-assembly 80 of spline head assembly 40. The drive pinch wheel 86 of sub-assembly 80 grabs the spline material 18 and moves it forward to the left position adjacent to the vertical wall 24 and bottom ledge 26 of the vertical splining table 22. This is accomplished by the operator, who depresses the spline insert reset switch 238. This causes the spline head assembly 40, the corner clamp assembly 170, and the spline cutter air cylinder 66 and piston 68 to push forward to allow the idler pinch wheel 88 and the drive pinch wheel 86 to separate. The spline head assembly 40 is activated by the pneumatic slide guide 44 and the corner clamp assembly is activated by the pneumatic slide guide 174. This allows free passage of the spline 18 between wheels 86 and 88 and onward to spline cutter housing 62. The operator manually inserts the spline 18 into the spline insert hole opening 72 of spline cutter sub-assembly 60, and he continues to insert the spline 18 approximately three inches until its movement is stopped by the spline cutter blade 64. Next, the operator depresses the spline insert reset switch 238 a second time, causing the spline head assembly 40, the corner clamp assembly 170 and the spline cutter air cylinder and piston 66 and 68 to return to their inactivated (reset) positions and causing the spline 18 to be pinched between idler pinch wheel 88 and the drive pinch wheel 86. The spline cutter blade 64 is then released. Next, the motor 84 of the spline feed advance sub-assembly 80 is activated, which causes the spline 18 to be forced through the spline cutter housing 62 and between three spline guides being spline guide plates 144 and 146, and spline guide door 134 of spline wheel sub-assembly 130 which captures the spline 18 on three sides. The spline 18 is captured on the fourth side by the spline wheel 140 of spline wheel subassembly 130. The spline 18 continues to advance under corner clamp 178, which is continuous with the spline wheel 140, and into spline corner cutting component 184. Then, the motor 84 of the spline feed-advance sub-assembly 80 stops. The spline 18 does not need to be inserted in this way for every frame 12; this procedure is only used when a new roll 18R of spline 18 must be loaded into the spline roll holder spindle 34.

Next, the operator positions a screen frame 12 against the horizontal ledge wall 26 and to the left against the screen guide pinch plate 206. The operator then draws the edge of the screen material 16 from the roll 16R, under the screen roll cutter assembly 200, and across the screen frame 12 until the screen material 16 completely covers the screen frame 12. The operator then holds the screen material 16 in the upper right end corner 12D of the screen frame 12.

Next, the operator depresses the cycle start foot switch 250, which initiates the automatic screening cycle for the operation of applying, pushing, inserting and cutting of spline 18 and fabric materials 16 into a screen retaining channel 14 of window frame 12W. The following is a description of the screening and splining cycle where the automated window screen assembly apparatus 10 is used on one side 12S of frame 12 and this occurs without any further interaction from the operator. Splining head assembly 40 is activated by depressing foot switch 250 which then simultaneously activates the pneumatic slide guide 44, the corner clamp 178, and splining wheel 140 to start the splining cycle. More particularly, after the cycle start foot switch 250 is depressed, the frame guide clamp 192 of frame clamp assembly 190 engages the screen frame 12 and pushes and holds it diagonally against the horizontal ledge wall 26 of frame assembly 30 and to the left against the screen guide pinch plate 206 of frame clamp assembly 190. This frame guide clamp 192 is activated by the frame clamp solenoid 276 of the electro-pneumatic air system 260, which then activates the frame clamp air cylinder 194 and frame clamp piston 196. The spline guide door 134 opens (activated by the spline guide door solenoid 270), which exposes one side of the spline 18. In addition, the tension wheel 102 is engaged by the air cylinder 108 and piston 110 which is activated by the slack wheel solenoid 278. Tension wheel 102 presses the screen material 16 into the surface wall groove 36 in the vertical surface wall 24. Tension wheel 102 introduces enough slack in the screen material 16 to prevent the screen material 16 from being inserted into the screen frame 12 too tightly.

The corner clamp assembly 170 provides the simultaneous and dual function of cutting the spline 18 and holding the corner end 12B of screen frame 12 in place, such that, the corner clamp 178 engages the spline 18 and cuts the spline 18 just prior to the insertion into the screen retaining channel 14 of screen frame 12. As previously mentioned, the splining wheel 140 of splining head assembly 40 also engages the spline 18 and pushes the spline 18 and screen material 16 into the screen retaining channel 14 of screen frame 12. The spline head assembly 40, the corner clamp assembly 170 and the spline corner cutting component 184 are pushed forward by the corner clamp solenoid 274 and head assembly solenoid 268 causing several actions. The spline corner cutting component 184 is pressed against the screen frame 12. The spline 18 is located through the opening 72 in the spline corner cutting component 184. The corner clamp 178 continues to move forward after the spline corner cutting component 184 stops, causing the spline to be sheared off. Spline wheel guides 144 and 146 continue forward until they contact the screen frame 12, acting as guides for the still-moving spline. The corner clamp 178 and the spline wheel 140 continue forward movement, and push the screen material 16 and the spline 18 into the screen retaining channel 14. When the spline 18 and screen material 16 are fully inserted into the screen retaining channel 14, all forward motion stops. The last action is that the drive pinch wheel 86 and idler pinch wheel 70 separate, allowing the spline material 18 to move freely through the spline cutter housing 62.

Next, the spline head motor 50 activates, which moves the entire spline head assembly 40 to the right along the timing belt slide guide 52. The spline head assembly 40 moves a short distance to the right. The spline head assembly 40 and screen cutter wheel 156 move horizontally along the screen retaining channel 14 of screen frame 12 until the frame sensor 124 detects the end corner 12A of screen frame 12. Then the screen cut solenoid 282 enables air cylinder 158 and piston 160 to engage the screen cutter wheel 156. The screen cutter wheel 156 positions between the groove made between the spline 18 and edge of the screen retaining channel 14. The screen cutter wheel 156 presses against the screen material 16 in this groove, cutting it as the spline head assembly 40 moves to the right. As it moves to the right, the screen material 16 and the spline 18 are being inserted into the screen retaining channel 14 by the rolling spline wheel 140 and the excess screen material 16 is being cut. The movement continues until the frame sensor 124 detects the edge of the screen frame 12. The spline 18 is then cut by the spline cutter knife blade 64 and the splining wheel 140 continues to move a small distance forward (in the same direction to the right) to push the cut spline 18 into the corner end 12A. When the edge of the screen frame 12 is detected, the tension wheel 102 is immediately released.

When the frame sensor 124 detects the edge of the screen frame 12, the spline head motor 50 stops and the spline 18 is cut by the spline knife blade 64 in the spline cutter housing 62. The movement of the spline knife blade 64 occurs when the spline cut piston 66 and cylinder 68 are activated by the spline cut solenoid 272. The spline head motor 50 starts again, and moves the spline head assembly 40 further to the right, inserting the remainder of the spline 18 into the corner. The spline head assembly 40 is then retracted and the spline cutter 64 moves again in the same direction to finish cutting the screen 16 into the corner end 12A. The spline head assembly 40 retracts, while the screen cutter wheel 156 remains in the screen retaining channel 14. This retraction causes the spline 18 to be trapped between idler pinch wheel 88 and drive pinch wheel 86. The spline cutter blade 64 is also released. In addition, the spline guide door 134 is closed. The spline wheel guide plates 144 and 146 are repositioned to their starting, retracted position. This repositioning occurs when the head assembly 40 is retracted, and the spline wheel guides 144 and 146 contact the spline wheel spline guide reset bracket 148. The spline head motor 50 is activated again for a short distance to allow the screen cutter wheel 156 to move into the corner 12A of the screen frame 12, cutting the remainder of the excess screen material 16. The spline head assembly 40 direction is now reversed and the spline head assembly 40 now traverses back along the pneumatic slide guide 44 to the almost home sensor 58a position on the timing belt slide guide 52. The spline head motor 50 reverses direction and moves the entire spline head assembly 40 to the left until it contacts the almost home sensor 58a. As it is moving to the left, the idler pinch wheel 88 and drive pinch wheel 86 securely hold the spline 18, and the left-ward movement of the spline head assembly 40 causes the spline 18 to be drawn off of the spline material roll 18R.

In the present invention, the spline material 18 is drawn off of the spline roll 18R during the left return phase, instead of the right splining phase, so that the spline 18 hangs freely during the splining phase. This prevents the spline 18 from being stretched as it is being inserted into the screen retaining channel 14 of screen frame 12. If it was being drawn off of the roll 18R as it was being splined, stretching would occur. If the spline were stretched, after time the spline 18 would return to its relaxed length, pulling away from the frame corners 12A, 12B, 12C, and 12D.

When the spline head assembly 40 reaches the almost home sensor 58a, the corner clamp 178 on the corner clamp mounting bracket 176 retracts and the spline head assembly 40 travels back to the home sensor 58b position. Then the cutter wheel 156 of the screen cutter sub-assembly 150 and frame guide clamp 192 of the frame clamp assembly 190 are released from the screen frame 12. The spline advance DC motor 84 is now enabled and a new strip of spline material 18 is fed and advanced under the splining wheel 140 and corner clamp 178 of the corner clamp bracket 176. The spline advance DC motor 84, which turns the drive pinch wheel 86, is enabled for a short period of time. This moves spline 18 under the corner clamp 178 and into the spline corner cutting component 184. The operator then manually depresses the screen roll cutter switch 240 which enables the roll cutter wheel 214 on the cutter wheel pivot bracket 212 to cut the screening material 16 off of its screen roll 16R. This causes the roll cut solenoid 280 to be activated, which enables the rodless air cylinder 202 and the piston 204 to move cutter wheel 214 against screen material 16 which in turn cuts it from screen roll 16R. This, in turn, moves cutter wheel 214 downwardly against screen guide pinch plate 210, thereby cutting screen material 16 off from the roll 16R. The cutter wheel 214 automatically retracts upward, returning to its starting position. The operator then rotates the screen frame 12 180° degrees, repositions the screen frame 12 against the left side slide support guide 30 and frame positioning clamp 28 to align screen frame 12 properly, and then the operator depresses the power switch 234 to restart another splining cycle. The operator removes the screen frame 12 from the vertical surface wall 24, rotates the screen and the frame 180° and repositions the frame and screen against the horizontal ledge wall 26 and the screen guide pinch plate 210. At this point, one side of the screen frame 12 has been completed.

The operator depresses the cycle start switch 284 to spline the second side. When that is complete, he rotates it 90° and splines the third side. When that is complete, he turns the screen frame 180° and completes the fourth side.

The operator then positions a screen frame 12 against the vertical surface wall 24 and bottom ledge 26 of splining table 22; and along the left side slide support guide 30 where the frame positioning clamp 28 is then placed next to the screen frame 12 for clamping and holding screen frame 12 in place. The operator then manually draws the screen material 16 from the screen roll 16R and pulls the screen material 16 across the screen frame 12. The operator then holds the screen material 16 in the upper right side end-corner 12D of the screen frame 12, and the operator is now ready to start the window screen assembly process again.

ADVANTAGES OF THE PRESENT INVENTION

Accordingly, an advantage of the present invention is that it provides for an automated window screen assembly apparatus that automatically programs the splining cycles of applying, pushing, inserting and cutting of spline and fabric materials into a grooved channel of the window screen frame, without the necessity of the frame having to be blocked and squared.

Another advantage of the present invention is that it provides for an automated window screen assembly apparatus that has assemblies and component parts of simple design for ease of manufacturing which will increase productivity and lower the cost of manufacture of a window screen.

Another advantage of the present invention is that it provides for an automated window screen apparatus that has minimal operator input in handling and operating the apparatus with very low maintenance and repair for the operational production of the window screens.

Another advantage of the present invention is that it provides for an automated window screen assembly apparatus that uses simplified designed clamping assemblies which will block the frame properly by using a diagonal frame clamp and a corner clamp.

Another advantage of the present invention is that it provides for an automated window screen assembly apparatus that uses a spline head assembly for automatic frame size detection, such that the apparatus can work on a variety of frame sizes without further machine programming.

Another advantage of the present invention is that it provides for an automated window screen assembly apparatus that uses a simplified design for a spline feed assembly, such that the spline is in a relaxed, non-tensioned state when the frame is being splined which then minimizes stretch within the spline. This minimizing of spline stretch is accomplished by drawing the spline from the spline roll on the return path of the splining head assembly.

Another advantage of the present invention is that it provides for an automated window screen assembly apparatus that automatically cuts the spline at each of the frame corners and fully inserts the spline into each of the frame corners.

Another advantage of the present invention is that it provides for an automated window screen assembly apparatus that uses a slack wheel sub-assembly for putting a predetermined amount of slack tension in the screen material as the window screen frame is being assembled.

Another advantage of the present invention is that it provides for an automated window screen assembly apparatus that uses a corner clamp assembly which ensures both spline and screen material are completely and properly inserted into each frame corner.

Another advantage of the present invention is that it provides for an automated window screen assembly apparatus that uses a screen splining table having a vertical surface wall which uses gravity to ensure that the screen material properly drapes across the screen frame surface; such that the screen material does not have to be held firmly in place while the splining occurs.

Another advantage of the present invention is that it provides for an automated window screen assembly apparatus that uses a screen roll feed holder assembly having a plurality of individual holding compartments which are designed so that the individual screen rolls do not interfere with one another when the operator changes roll sizes.

Another advantage of the present invention is that it provides for an automated window screen assembly apparatus that uses a trimming sub-assembly which trims the miscellaneous strands of screen material being left in each of the frame corners.

A further advantage of the present invention is that it provides for an automated window screen assembly apparatus that uses a screen frame turning assembly which automatically turns the screen frame after each side is splined. This will eliminate total operator input until the window screen is completely done.

A still further advantage of the present invention is that it provides for an automated window screen assembly apparatus that uses a screen material advance assembly which automatically draws the screen material from the screen roll, such that the screen material is drawn across the screen frame until a screen sensor detects the edge of screen frame and stops the advance of the screen material.

An even further advantage of the present invention is that it provides for an automated window screen assembly apparatus that is simple to manufacture and assemble; and is also more cost efficient in operational use than previous automated window screen assembly devices.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A splining apparatus for seating an elongated flexible spline material into a screen retaining channel of a screen frame to secure flexible screen material thereto comprising:

a) means for receiving and holding a screen frame, said means including an elongated horizontal support that supports the screen frame;

b) carriage means mounted on the said means for receiving and holding;

c) means for moving said carriage means linearly between a first position and a second position;

d) means, mounted on said carriage means, for supplying spline material to the screen frame and for joining the spline material and screen material to the screen frame as said carriage means moves from said second position to said first position;

e) means located at said first position for supplying screen material to the screen frame;

f) means located at said second position for feeding spline material to said means for supplying and joining spline material;

g) a corner clam p cutting means, non-movably mounted on said means for receiving and holding at said first position, for cutting the spline material at said first position, and for seating the spline material and the screen material at said first position into the screen retaining channel of the screen frame;

h) sensor means for sensing an end of the screen frame and for stopping movement of said carriage means at said second position; and i) said means for supplying and joining includes a spline wheel sub-assembly for inserting and seating the spline material and screen material into the screen retaining channel as said carriage means and said means for supplying and joining move from said first position to said second position, and also includes a spline cutter sub-assembly for cutting the spline material at said second position after the spline material and the screen material have been seated in said screen retaining channel.

2. A splining apparatus in accordance with claim 1, wherein said means for receiving and holding includes a work support assembly having a vertical splining table including a vertical surface wall and said horizontal support; and a vertical screen guide pinch plate for holding the screen frame against said vertical splining table.

3. A splining apparatus in accordance with claim 2, wherein said vertical surface wall of said splining table is angled from the perpendicular so as to lean the screen frame against said surface wall and said horizontal support of said splining table, so that the screen frame does not fall off when said splining apparatus is in operation.

4. A splining apparatus in accordance with claim 2, wherein said vertical surface wall of said splining table includes a U-shaped, horizontal grooved channel for proper tensioning of said screen material within said screen frame.

5. A splining apparatus in accordance with claim 1, wherein said elongated horizontal support includes a pneumatic slide guide and a motor connected to a timing belt slide guide for moving said means for supplying spline material along said timing belt slide guide, wherein said means for supplying spline material includes a spline head assembly.

6. A splining apparatus in accordance with claim 5, wherein said carriage means is mounted on said timing belt slide guide for the support of said spline head assembly.

7. A splining apparatus in accordance with claim 1, wherein said means for supplying screen material includes a screen roll feed holder assembly for holding screen rolls of the screen material and supplying the screen material to the screen frame.

8. A splining apparatus in accordance with claim 7, wherein said screen roll holder assembly includes a housing having a plurality of holding compartments for holding and dispensing of various sized screen materials.

9. A splining apparatus in accordance with claim 1, wherein said corner clamp cutting means includes a corner clamp, an L-shaped spline corner cutting component connected thereto, a mounting bracket for mounting said corner clamp cutting means, and a pneumatic slide guide having an air cylinder and piston for providing the clamping action which moves said corner clamp in and out of the screen retaining channel of the screen frame as said corner clamp inserts both the spline and screen materials at said first position.

10. A splining apparatus in accordance with claim 1, wherein said spline cutter sub-assembly includes a spline cutter housing, a knife blade in said housing, and an air cylinder and piston for inserting and pushing said knife blade through the spline material to cut the spline material.

11. A splining apparatus in accordance with claim 10, wherein said means for supplying spline material includes a spline feeding advance sub-assembly having a motor, a drive pinch wheel mounted on said motor for actively pushing the spline material forward through a spline cutter, and an idler pinch wheel for holding the spline material against said drive pinch wheel, such that the spline material does not shift or move.

12. A splining apparatus in accordance with claim 10, wherein said spline wheel sub-assembly includes a spline wheel for rolling the spline material and screen material into the screen retaining channel of the screen frame, and a pair of spline guide plates for guiding the spline material from said spline cutter housing under said spline wheel and said corner clamp and into said L-shaped spline corner cutting component.

13. A splining apparatus in accordance with claim 1, wherein said means for supplying spline material includes a spline head assembly having a slack wheel subassembly for providing a predetermined amount of slack tension in the screen materials, so as not to overtighten the screen material in the screen frame.

14. A splining apparatus in accordance with claim 1, wherein said means for supplying spline material includes a spline head assembly having a screen cutter sub-assembly for cutting the excess screen material off of the screen frame after the spline material and screen material have been inserted in the retaining channel of the screen frame.

15. A splining apparatus in accordance with 2, wherein said work support assembly includes a frame clamp assembly for receiving and holding the screen frame on said work support assembly in preparation for the splining cycle to begin.

16. A splining apparatus in accordance with claim 1, wherein said means for supplying screen material includes a screen roll cutter assembly for cutting the screen material in a vertical direction from a screen roll being held in said means for supplying screen material.

17. A splining apparatus in accordance with claim 1, further including an electronic control panel for the electronic control of said splining apparatus.

18. A splining apparatus in accordance with claim 17, wherein said electronic control panel includes a panel housing and circuit having a power on switch, a power indicator light, connected thereto, a screen roll cutter switch, a spline insert switch connected to a computer module, said computer module connected to said circuit for automatically controlling said apparatus, a plurality of solid state relays in said circuit for controlling said apparatus, and a cycle start foot switch for initiating a splining cycle.

19. A splining apparatus in accordance with claim 1, further including an electro-pneumatic air system for providing pneumatic air to a plurality of air cylinders and pistons within said splining apparatus.

20. A splining apparatus in accordance with claim 19, wherein said electro-pneumatic air system includes a plurality of air lines, a compressor for supplying air to said plurality of air lines; a plurality of solenoids connected to said air lines for controlling the air supply to said air cylinders and pistons in said splining apparatus.

21. A splining apparatus in accordance with claim 1, further including a screen frame rotational assembly for rotating the screen frame at the end of each splining cycle.

22. A splining apparatus in accordance with claim 7, wherein said means for supplying screen material includes a screen material advance assembly for advancing the screen material from a screen roll in said screen roll feed holder assembly at the start of a splining cycle.

23. A splining apparatus in accordance with claim 7, wherein said means for supplying saline material includes a spline head assembly which further includes a spline feed-advance sub-assembly for drawing the spline material off a spline roll as said spline head assembly moves from said second position to said first position.

* * * * *